Feb. 21, 1967 R. C. GESCHWENDER 3,304,669
CONTAINERS AND SPACE-ENCLOSING STRUCTURES
Filed April 19, 1961 12 Sheets-Sheet 1

Robert C. Geschwender
Inventor
Koenig, Pope, Senniger and Powers
Attorneys

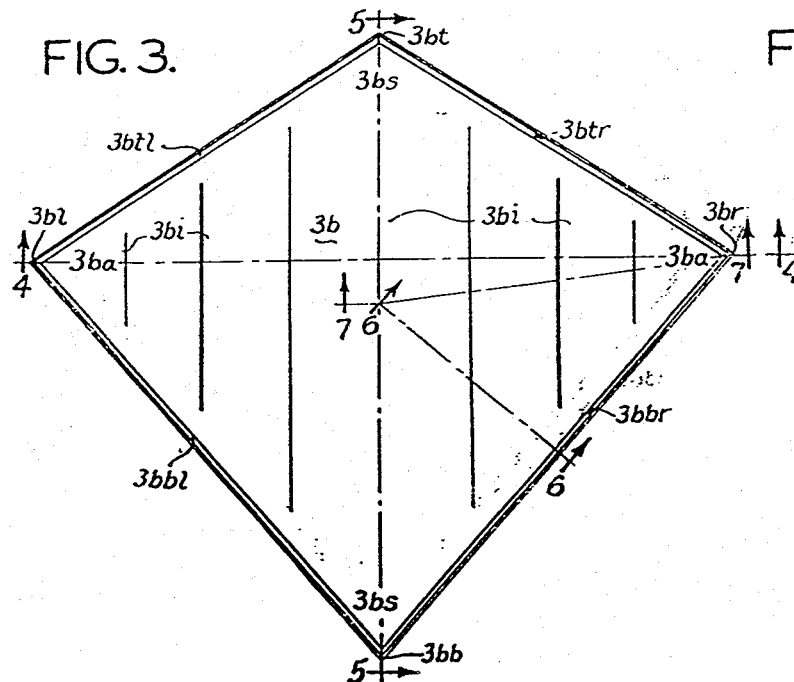
FIG. 3.
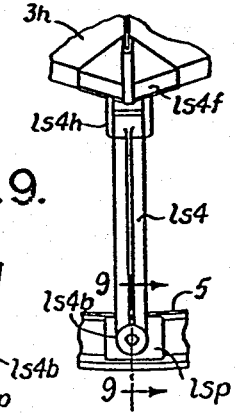
FIG. 5.
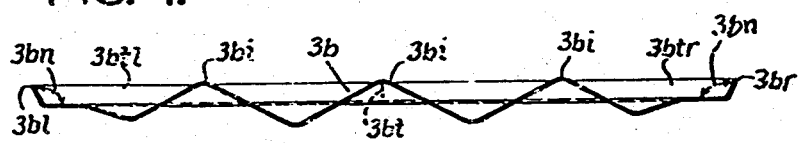
FIG. 4.
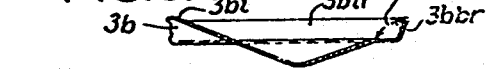
FIG. 6.
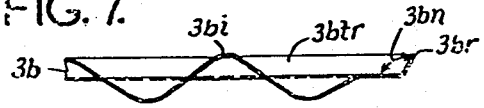
FIG. 7.
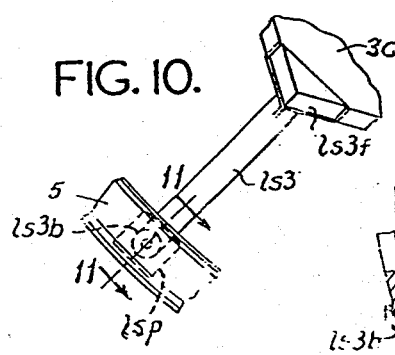
FIG. 8.
FIG. 9.
FIG. 10.
FIG. 11.

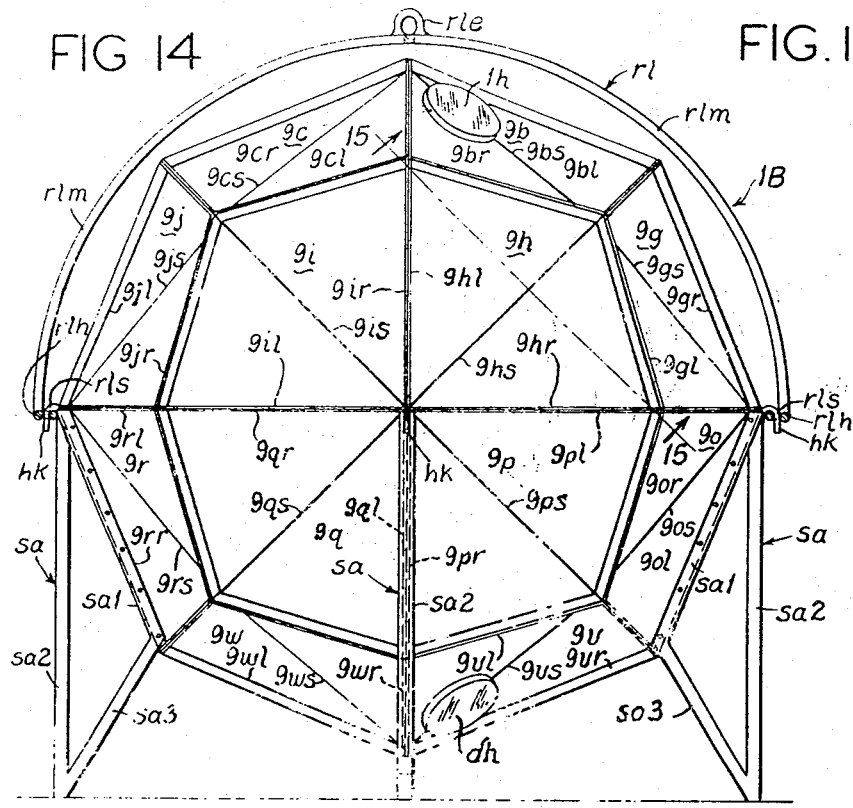
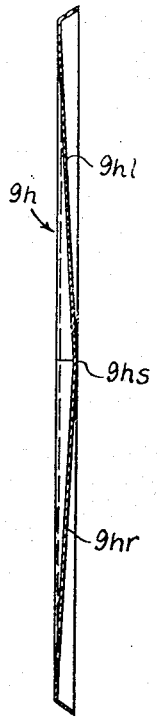
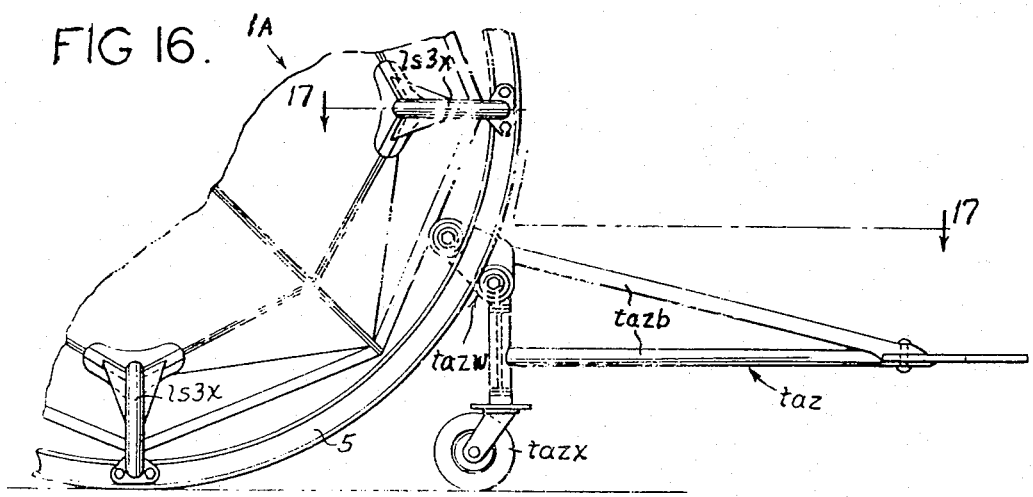

Feb. 21, 1967    R. C. GESCHWENDER    3,304,669
CONTAINERS AND SPACE-ENCLOSING STRUCTURES
Filed April 19, 1961    12 Sheets-Sheet 6

Feb. 21, 1967   R. C. GESCHWENDER   3,304,669
CONTAINERS AND SPACE-ENCLOSING STRUCTURES
Filed April 19, 1961   12 Sheets-Sheet Feb. 21, 1967  R. C. GESCHWENDER  3,304,669
CONTAINERS AND SPACE-ENCLOSING STRUCTURES
Filed April 19, 1961  12 Sheets-Sheet 11

United States Patent Office 3,304,669
Patented Feb. 21, 1967

3,304,669
CONTAINERS AND SPACE-ENCLOSING STRUCTURES
Robert C. Geschwender, Lincoln, Nebr., assignor to Lancaster Research and Development Corporation, Lincoln, Nebr., a corporation of Nebraska
Filed Apr. 19, 1961, Ser. No. 104,114
28 Claims. (Cl. 52—81)

This invention relates to containers and space-enclosing structures, and more particularly to such structures and containers which are constructed from modules including rigid straight frame members.

Among the several objects of this invention may be noted the provision of containers which are generally spherical and have a maximum strength-to-weight ratio and a minimum tare-to-volume ratio; the provision of such containers which can withstand balanced and spot loads equally well on all surfaces; the provision of containers of the class described which are composed of a minimum number of modular components and preferably of only one set of identical or isomorphic, flanged, developable, generally flat panels in which all flange angles have an equal degree of pitch and which panels may be nested when in a dissassembled state; the provision of such containers in which the flanges of the panels produce a frame about the enclosed area with the panels acting in conjunction with the frame to produce an infinite number of triangles that form a truss; the provision of containers which enclose a maximum volume with any given amount of material of construction to produce a maximum strength-to-material-weight ratio at that volume; the provision of containers of the class described which are portable and/or mobile and may be easily moved by rolling; the provision of such containers which have a single conveniently-accessible hatch which may be used for both receiving and emptying material into and out of the container; the provision of such containers which may be economically produced, easily constructed and have a minimum number of component parts; the provision of space-enclosing structures which may be used for buildings, both fixed and portable, as well as for roofs and shelters; and the provision of methods for conveniently forming and fabricating such space-enclosing structures and containers. Other objects and features will be in part apparent and in part pointed out hereinafter.

The invention accordingly comprises the constructions and methods hereinafter described, the scope of the invention being indicated in the following claims.

In the accompanying drawings, in which several of various possible embodiments of the invention are illustrated, FIG. 1 is a top plan view of a contanier of the present invention including a tow bar;

FIG. 3 is a top plan view on an enlarged scale of a kite-shaped panel component of the FIG. 1 container;

Figure 1:
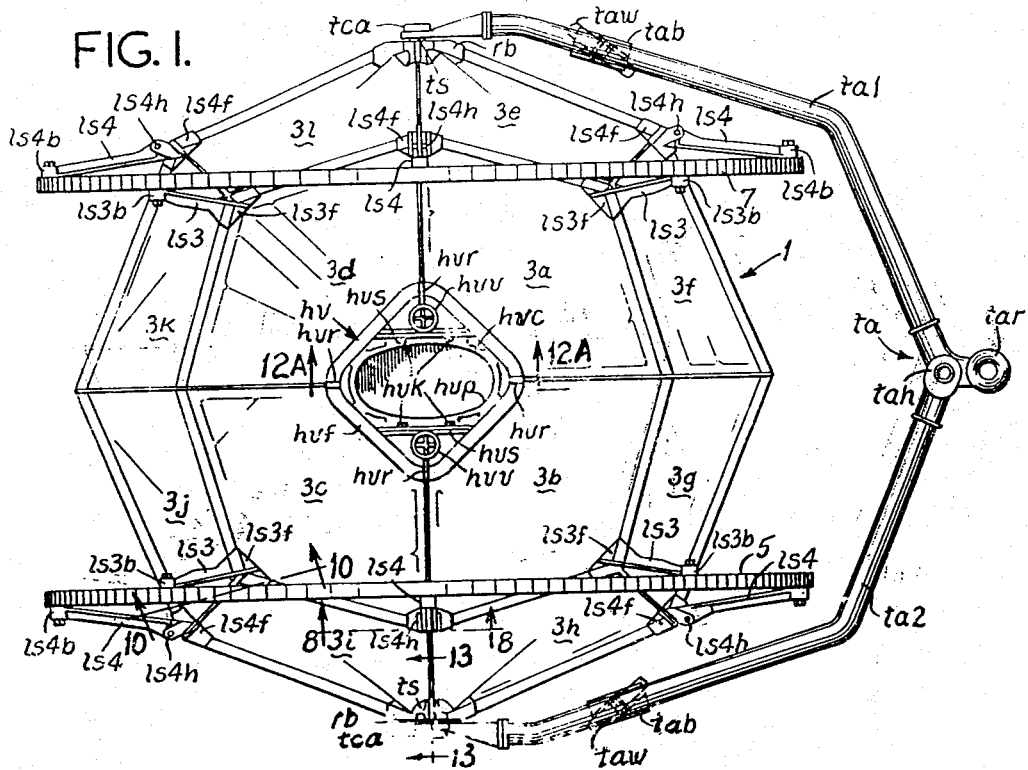
Figure 2:
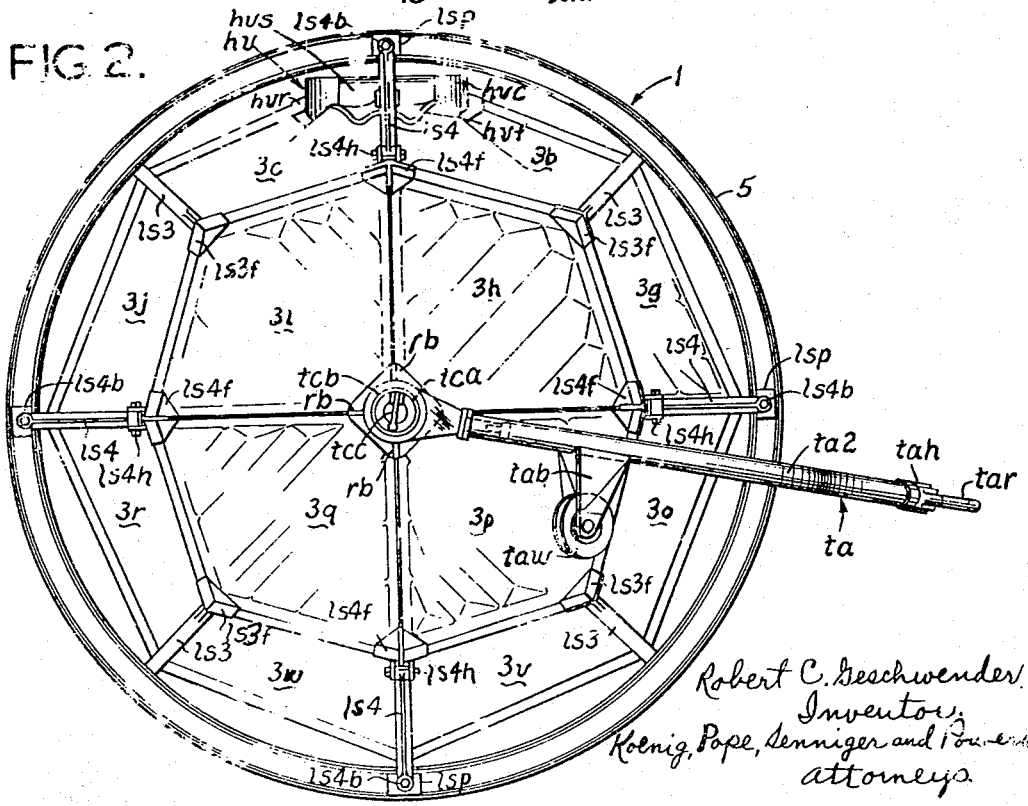
FIG. 2 is a side elevation of the container of FIG. 1.
Figure 12A:
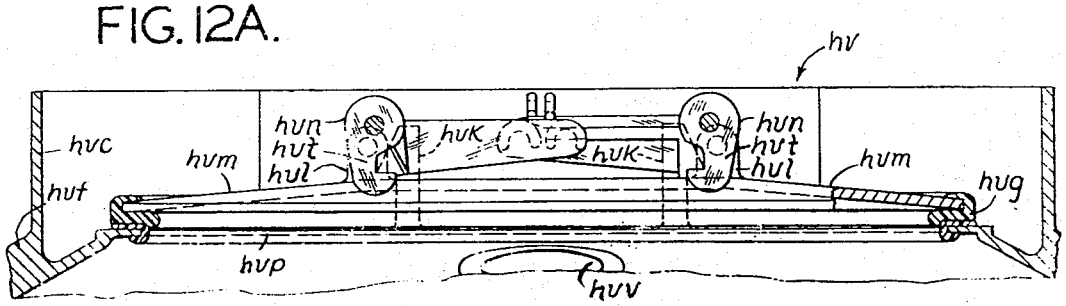
Figure 13:
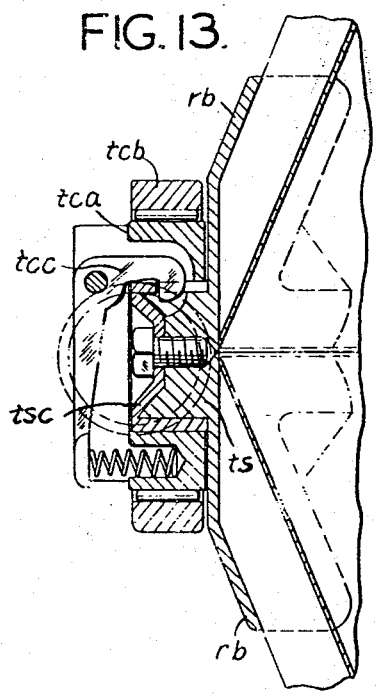
Figure 12B:
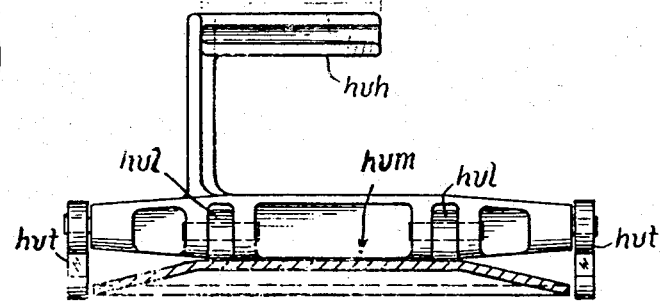
Figure 12C:
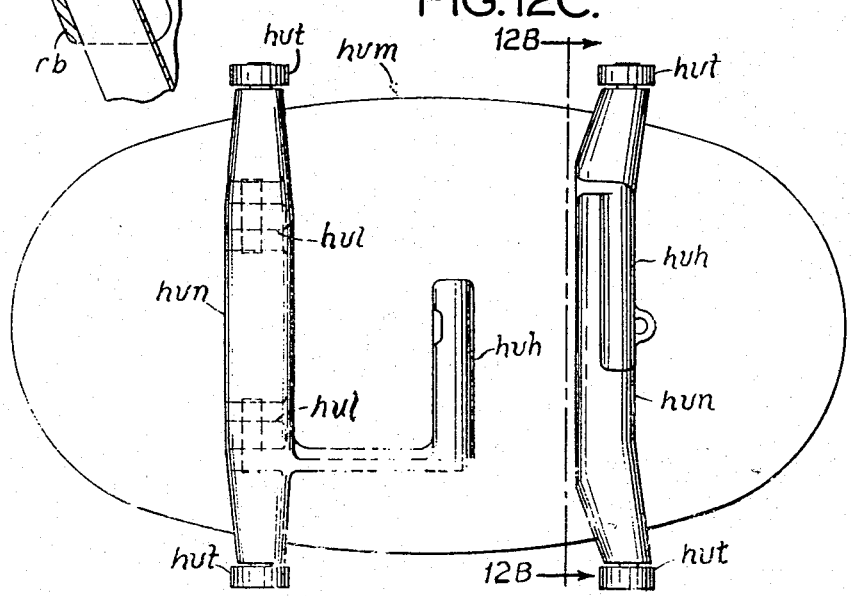
Figure 17:
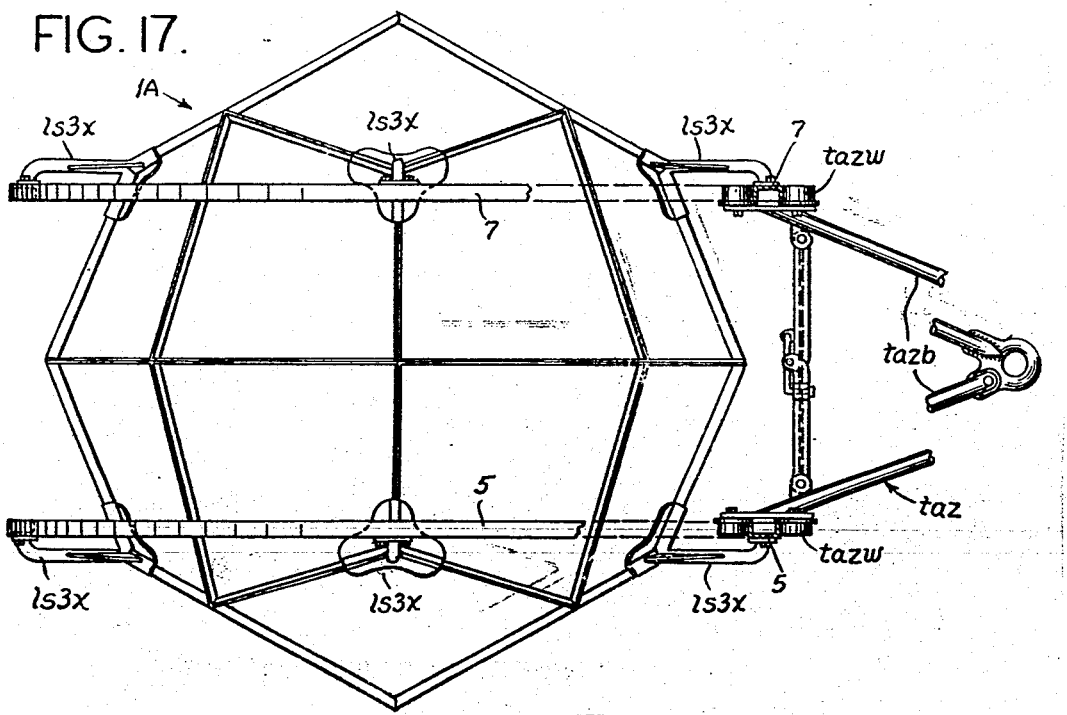
Figure 18:
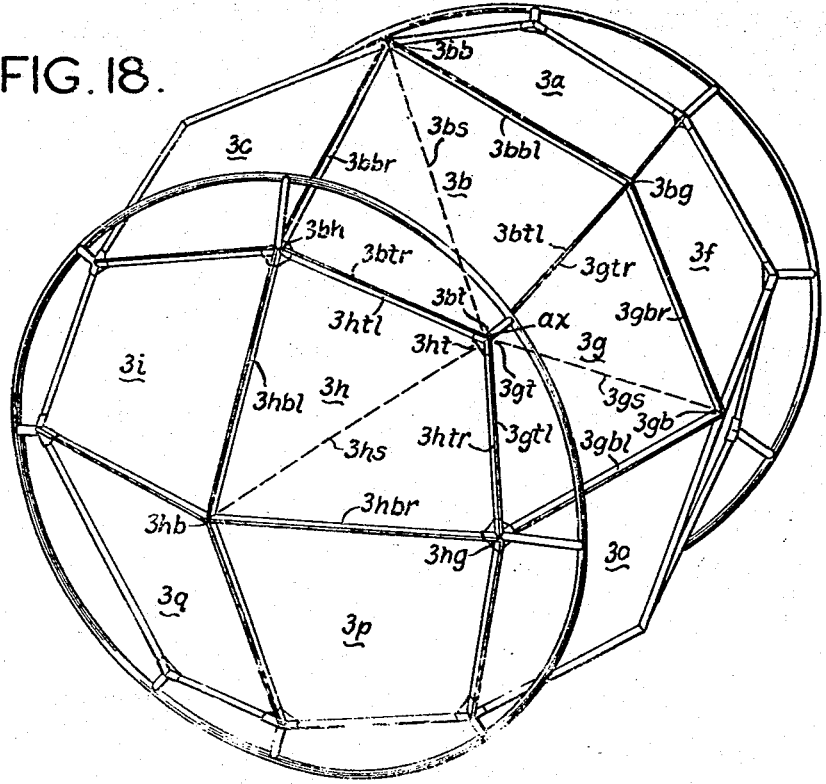
Figure 19:
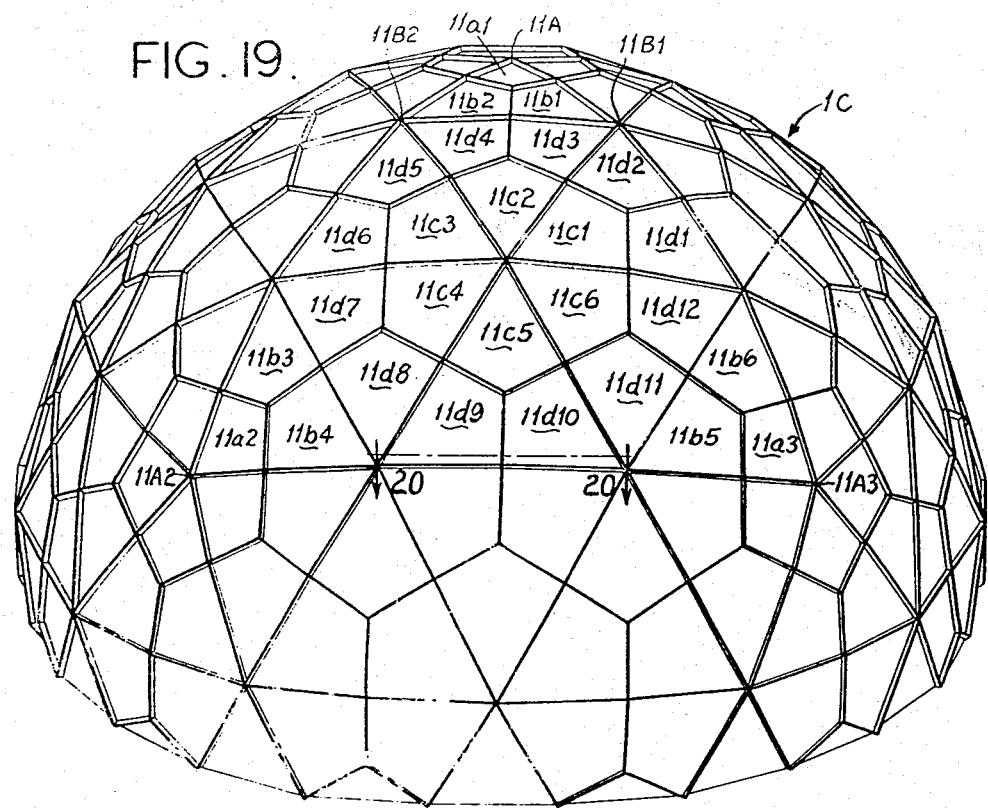
Figure 20:
Figure 47:
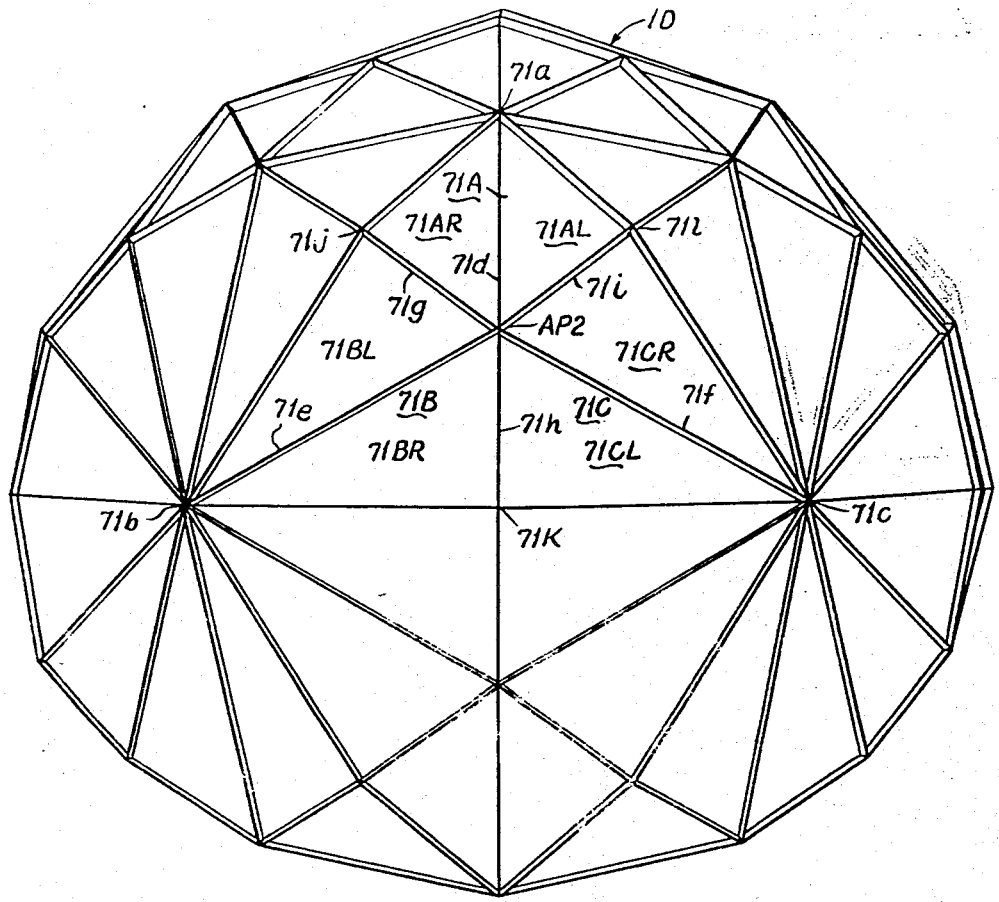
Figure 45:
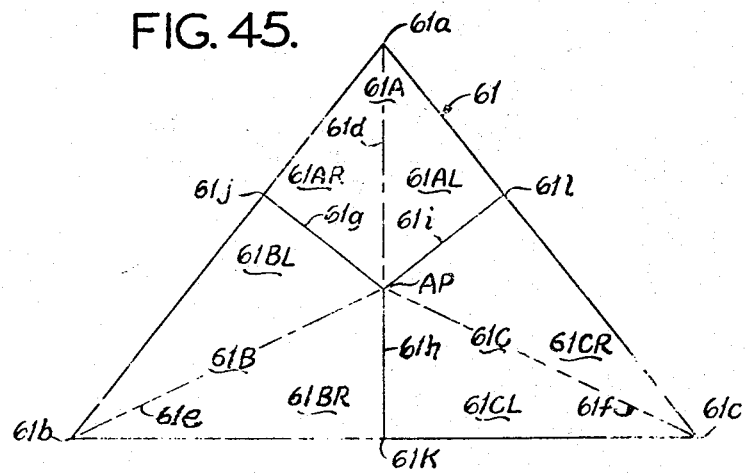
Figure 48:
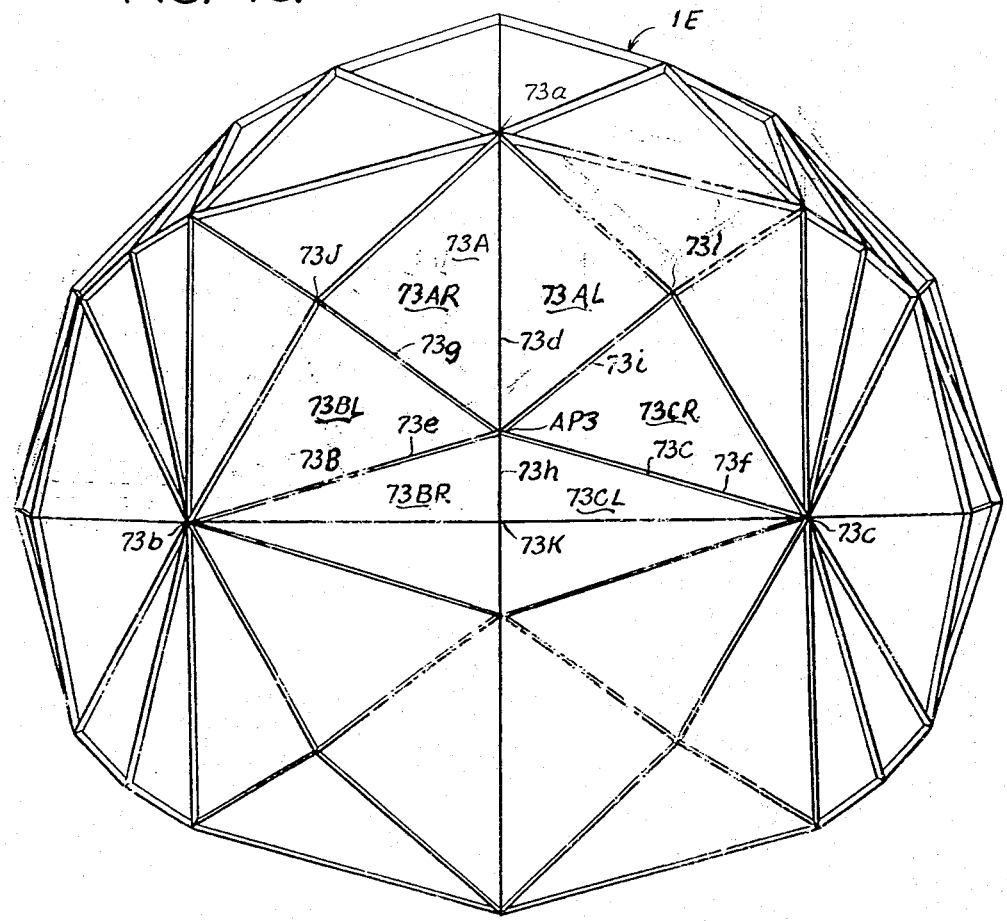
Figure 46:
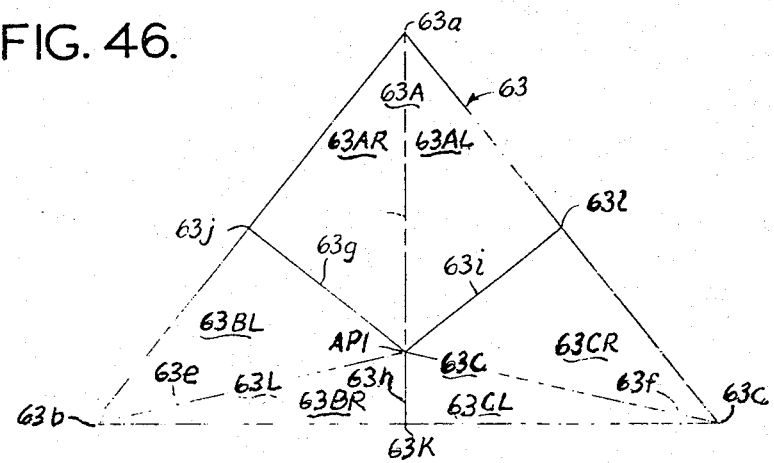
Figure 49:
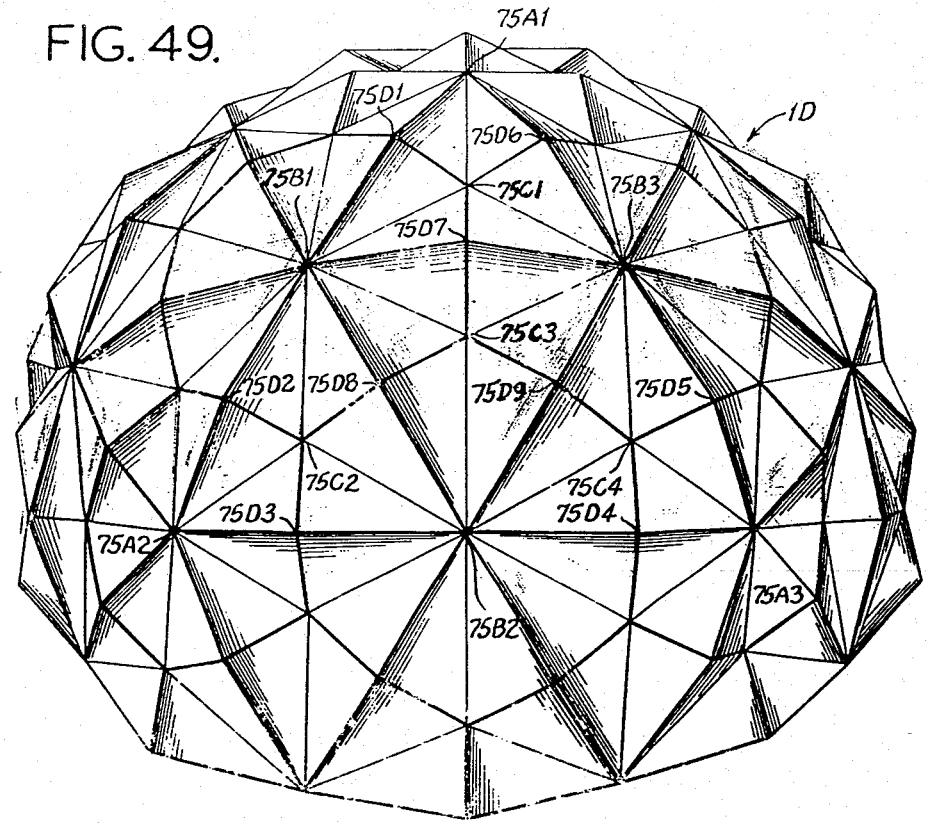

FIGS. 4—7 are cross sections taken on lines 4—4, 5—5, 6—6 and 7—7, respectively, of FIG. 3;

FIGS. 8 and 10 are enlarged detail elevations of leg strut components of the container of FIG. 1 as viewed respectively along lines 8—8 and 10—10 of FIG. 1;

FIGS. 9 and 11 are cross sections taken on lines 9—9 and 11—11, respectively, of FIGS. 8 and 10;

FIG. 12A is an enlarged cross section of a hatch and vent component taken on line 12A—12A of FIG. 1;

FIG. 12B is a cross section of a hatch cover taken on line 12B—12B of FIG. 12C;

FIG. 12C is a top plan view of the hatch cover;

FIG. 13 is an enlarged cross section of tow bar connector and stud components taken on line 13—13 of FIG. 1;

FIG. 14 is an elevation of another container embodiment of the present invention;

FEB. 15 is an enlarged cross section taken on line 15—15 of FIG. 14;

FIG. 16 is an elevation of a portion of still another container embodiment of this invention with an alternate tow bar component;

FIG. 17 is a top plan view of the container embodiment of FIG. 16;

FIG. 18 is a perspective diagrammatic view of the container of FIGS. 1 and 2;

FIG. 19 is a perspective view of a space-enclosing structure of the present invention;

FIG. 20 is an enlarged cross section taken on line 20—20 of FIG. 19;

FIGS. 21A and 21B through FIGS. 24A and 24B illustrate four systems employed in the present invention to determine the modules and kite-shape components thereof;

FIGS. 25–44 illustrate various exemplary steps followed in determining the various parameters of components of the present invention;

FIGS. 45 and 46 illustrate two different systems employed in the present invention for subdividing modular triangular areas into six component triangular figures;

FIG. 47 is a perspective view of another embodiment of a space-enclosing structure of the present invention constructed in accordance with the system illustrated in FIG. 45;

FIG. 48 is a perspective view of still another space-enclosing structure embodiment of the present invention constructed in accordance with the system illustrated in FIG. 46; and FIG. 49 is a perspecive view of yet another space-enclosing structure embodiment of the present invention.

Corresponding reference characters indicate corresponding parts throughout the several views of the drawings.

A variety of modular framework structures are known, particularly for building constructions, which utilize a grid of interconnected rib or strut members. However, such structures have a number of disadvantages such as the necessity for using curved ribs, or components having nondevelopable surfaces, or a large number of different-sized elements which must be assembled in a particular sequence or order. In accordance with the present invention, containers, and other space-enclosing structures, are provided which use straight rigid frame members, and/or modular components which are all identical, or which have a minimum number of different-sized modular components. These components have developable surfaces and may be conveniently nested for shipping or storing in a disassembled stage. The containers of this invention additionally incorporate a number of other novel features including very useful means for supporting and transporting the containers and for loading and unloading the contents thereof.

Referring now more particularly to the drawings, a container of the present invention is indicated generally at reference numeral 1. This space-enclosing structure is generally spherical in shape and comprises twenty-four identical, i.e., isomorphic, kite-shaped flanged panels, 3a–3x, the abutting flanges of which are secured together face-to-face to form a framework of straight rigid bars which define four-sided kite-shaped areas or figures. Each of these separate kite-shaped figures, as exemplified in FIG. 3 by panel 3b, has a line of symmetry 3bs and a perpendicular line of asymmetry 3ba, the former dividing panel 3b into two glove or mirror image similar triangles. The four vertices or corners of panels 3b are referenced as 3bt, 3br, 3bb and 3bl, thus indicating the top, right, bottom and left extremities of the panel. Each of the panels includes four integral flanges angled at the same pitch relative to the generally flat surface of the panel, and typified by right top and bottom and left bottom and top flanges 3btr, 3bbr, 3bbl and 3btl, respectively. The generally flat area of the panel is optionally corrugated to form spaced-apart reinforcing ribs 3bi which are parallel to the axis or line of symmetry 3bs.

The panels may be fabricated from any desired material of construction such as aluminum or plastic and may be laminated, insulated or protectively coated on the inner and/or outer surfaces thereof if the contents of the container will be corrosive or abrasive. The abutting flanges of the assembled panels may be secured together by any conventional means, such as by bolts, welding, adhesive, etc., and the face-to-face surfaces may be gasketed by applying, for example, a mastic on just the outer surfaces of the top right and bottom right flanges of each of the identical panels 3a–3x. When the panels are assembled, each set of abutting flanges will have gasket material therebetween. It will be noted that these twenty-four identical flanged panels in a disassembled condition may be nested one within the other to form a compact stack for shipping and storage. Also, male studs may be affixed to one set of top and bottom right flanges of each of the panels 3a–3x and will mate with properly dimensioned and positioned female sockets formed in the top and bottom left flanges. It is to be understood that the flanges may alternately be directed inwardly instead of outwardly, in which case the flange pitch angle will be an acute angle relation to the plane of the panel which angle is the supplement of the obtuse flange angle indicated at reference character 3bn.

As assembled to form a generally spherical container of FIGS. 1 and 2, each of the flanged kite-shaped panels 3a–3x is associated with the two other kite-shaped panels to form a generally triangular module comprising three dihedrally abutting panels. This is illustrated diagrammatically in FIG. 18 by the three kite-shaped areas constituted by flanged panels 3b, 3g and 3h which are organized together with top corners 3bt, 3gt and 3ht forming an apex ax at which the lines of symmetry 3bs, 3gs and 3hs converge. The bottom corners or tips of these three modularly associated kite-shaped panels, as indicated at 3bb, 3gb and 3hb, define the vertices of the generally triangular module. Thus, the eight triangular modules which comprises the twenty-four panel container each comprise nine rigid frame members defining three four-sided kite-shaped figures. The three rigid frame members or bars which intersect to form apex ax are constituted by the three pairs of abutting flanges (3btl, 3gtr), (3gtl, 3htr) and (3htl, 3btr). The two remaining flanges of each of the panels 3b, 3g and 3h, i.e. (3bbr, 3bbl), (3gbr, 3gbl) and (3hbr, 3hbl) comprise frame members which terminate at the other ends of the respective lines of symmetry to constitute the vertices 3bb, 3bg and 3hb. The other ends of these six frame members intersect at three vertices 3bh, 3bg and 3hg, which are located at the midpoints on the sides of the triangular module.

As will be described in greater detail hereinafter, each of the aforementioned vertices defines a circumscribing sphere, i.e., they lie at or on the surface of a surrounding spherical surface. All eight apices, however, fall inside the surface of such a circumscribing sphere.

In order to utilize this generally spherical container to store or transport various commodities, such as liquids or materials in particulate form, means for supporting and moving the container are provided. One such exemplary supporting and motivating means is illustrated in FIGS. 1 and 2 as comprising two parallel spaced-apart rings 5 and 7, which are preferably I-shared in cross section, affixed to the container to suspend or cradle it concentrically within the rings. This is accomplished by interconnecting four equally spaced points on each ring to four peripherally spaced apices of the container by means of leg struts ls3. As detailed in FIGS. 10 and 11, each of the eight identical leg struts ls3 has a bearing ls3b at one extremity and an apex-engaging fitting ls3f at its other extremity. Fitting ls3f includes two angled channel members, interconnected by a web, which receive the end portions of two kite-shaped panels and are secured thereto by any conventional means such as bolts, rivets or welding. The bearing ends ls3b are bolted to threaded bearing pads lsp which are affixed to the inner surfaces of the webs of rings 5 and 7. Optionally, eight of the eighteen four-bar junctions are interconnected to rings 5 and 7 by leg struts ls4 (FIGS. 1, 2, 8 and 9) having a bearing ls4b at one extremity and a four-bar vertex engaging fitting ls4f at the other, which is pivotal relative to the strut by a hinge ls4h. Each of the eight identical fittings ls4f comprises three angled channel members interconnected by a web and adapted to fit over and be secured to the end portions of three abutting sets of panel flanges which meet at four-bar junctions.

Two of the remaining ten four-bar junctions which are located on diametrically opposed points of the generally spherical container 1 are each provided with identical towing studs ts. As detailed in FIG. 13, each stud ts comprises a fitting with four channel-shaped ribs rb each of which fits over and is secured to an end portion of abutting flanges adjacent the four-bar junction intersection thereof. The outwardly projecting portion of ts is peripherally cut away at one portion and a cap tsc having a slotted skirt is bolted to this projecting end of ts. The recessed slot thus formed in the side surface of towing stud ts is engageable by a spring-biased catch tcc which is a component of a socket assembly tca. These stud-engaging socket assemblies tca are journalled within roller bearings tcb which are formed at the end of a clevis-shaped towing assembly ta, the two arms ta1 and ta2 having their other ends pivotally connected at a hinge tah. This towing assembly ta is provided with a tow ring tar adapted to engage a conventional towing catch mountable on towing vehicles. Tow bar arms ta1 and ta2 are fitted with brackets tab which carry wheels taw, the latter serving as a towing dolly for supporting the assembly ta when folded.

Container 1 is further provided with a hatch and vent unit hv (FIGS. 1, 2 and 12A–12C) secured symmetrically to four abutting panels 3a–3d at one of the remaining four-bar junctions. This unit comprises an opening or port hvp, an upstanding generally elliptical collar hvc formed with a scalloped flange hvf having four recessed channels hvr which fit over and are secured to the end portions of the abutting flange pairs of panels 3a–3d. Flange hvf has two vents hvv. Collar hvc has two opposing flat web portions hvs, each having a pair of catches hvk affixed to the opposing faces thereof. An elliptical hatch closure or cover hvm, having two pairs of apertured lugs hvl on its outer surface, is adapted to be detachably secured to collar hvc to cover port hvp. Two cross-cranks hvn are pivoted for eccentric rotation on the two aligned pairs of lugs hvl, each cross-crank carrying a catch-engaging latch hvt at each of its outer ends. Rotation of each of the cross-cranks hvn by means of operating handles hvh moves the four latches hvl into engagement with the mating catches hvk and the eccentric action of the cranks forces the closure hvm into firm closing and sealing engagement with the rim of port hvp. A gasket ring hvg is provided to insure a complete seal.

The mobile container 1 can be conveniently moved by means of any towing vehicle and towing assembly ta. By positioning container 1 under a hopper or feeding it by means of a discharge tube while container 1 is in an upright position, as illustrated in FIGS. 1 and 2 with hatch hv at the top, any fluid or particulate commodity can be easily loaded into the container 1. Unloading can be conveniently accomplished merely by rolling container 1 to a location over a receiving hopper or conveyor with the container in an inverted position, i.e., hatch $hv$ at the bottom.

The alternate embodiment of FIGS. 16 and 17 illustrates a container 1A which differs from container 1 in having eight modified leg struts $ls3x$, each secured to a three-bar junction, and an alternate towing assembly $taz$. Struts $ls3x$ are bent at their outer ends to form elbows and provide an offset so that the inner periphery of rings 6 and 7 may serve as a continuous circular race for two sets of rollers $tazw$. A telescoping cross-bar $tazb$ and two dolly wheels $tazx$ are also incorporated in the towing assembly $taz$. The operation of this container 1A is identical to that of the previously described container except for the difference in interconnecting the towing assemblies $ta$ and $taz$ to the respective containers.

Another embodiment of the present invention is indicated generally at reference numeral 1B in FIG. 14. This container is a portable bin and includes four support assemblies $sa$ affixed to four pairs of four-bar junctions symmetrically distributed about the periphery of the container 1B. Each support $sa$ comprises a triangular assembly of a straight rigid elongate channel member $sa1$, fitted over and affixed to two abutting flanges constituting a bar of the container's framework, a vertical leg member $sa2$, and a third angled leg member $sa3$. At each of the junctions of leg members $sa1$ and $sa2$ there is a lifting hook $hk$ projecting radially outward from the container and adapted to be engaged by a respective one of four slots or openings $rls$ of a lifting ring assembly $rl$. Assembly $rl$ is a cage which includes a circular hoop $rlh$ (having a diameter somewhat larger than the circumference of the container 1B), on which the slots $rls$ are formed, and meridian members $rlm$ which have a lifting eye $rle$ at their intersection.

The twenty-four flanged panel containers 1 and 1A have each of the three-bar junctions or apices within or falling inside of a circumscribing sphere. Container 1B, however, has each of its three-bar junctions or apices lying at or on the surface of the surrounding sphere. This structural difference is the result of dihedrally bending each of the panels $9a$–$9x$ along the respective lines of symmetry $9as$–$9xs$, thereby subdividing each kite-shaped area or figure into two glove or mirror image triangles, viz., $9hr$ and $9hl$. The obtuse dihedral angle of each of these twenty-four panels is shown in FIG. 15. A loading hatch $lh$ and a discharge hatch $dh$ are also provided in panels $9b$ and $9r$ respectively.

As each of these containers has an interior surface very closely approximating that of a hollow sphere, they can conveniently accommodate a spherical bag of plastic material which would serve as a liner for the containers.

In the preceding embodiments of the present invention, twenty-four flanged kite-shaped panel elements associated into eight generally triangular modules were employed to form generally spherical container structures. In the embodiment of FIG. 19, a generally hemispherical or dome-shaped structure 1C of the present invention is illustrated which is one-half of a generally spherical structure which contains a total of 540 kite-shaped areas, organized as disclosed above into 180 generally triangular modules. Thus, dome 1C comprises a total of 270 kite-shaped areas, or component parts thereof, associated together to form an additive total of 90 generally triangular modules or portions thereof. For example, dome 1C comprises 270 kite-shaped flanged panels such as $11a1$, $11b1$ and $11b2$ (or portions thereof) organized into 90 generally triangular modules such as that defined by vertices $11A$, $11B1$ and $11B2$. In a larger sense dome 1C comprises an additive total of ten generally triangular supermodules, or portions thereof, as defined by vertices $11A$, $11A2$ and $11A3$, each of the supermodules being formed by nine similar triangular modules. Each of these nine modules has three associated kite-shaped panels, e.g., ($11a1$, $11b1$ and $11b2$), ($11c1$, $11d1$ and $11d2$), ($11c2$, $11d3$ and $11d4$), ($11c3$, $11d5$ and $11d6$), ($11b4$, $11b3$ and $11a2$), ($11c4$, $11d7$ and $11d8$), ($11c5$, $11d9$ and $11d10$), ($11c6$, $11d11$ and $11d12$), and ($11a3$, $11b5$ and $11b6$). The exemplary supermodule constituted by these nine triangular modules is defined by the three vertices $11A$, $11A2$ and $11A3$. It will be noted that even with the large number of kite-shaped panels utilized to form structure 1C, all panels are generally similar in shape and there are only four identical or isomorphic groups of kite-shaped panels. In the supermodule $11A$, $11A2$ $11A3$, as in the other supermodules, there are three identical kite-shaped panels of a first category (e.g., $11a$, $11a2$ and $11a3$); six identical kite-shaped panels of a second category (e.g., $11b1$–$11b6$); six identical kite-shaped panels of a third category (e.g., $11c1$–$11c6$); and twelve identical or congruent kite-shaped panels of a fourth category (e.g., $11d1$–$11d12$).

As will be described in greater detail hereinafter, each of my generally spherical containers, or each of my space-enclosing structures having a shape generally corresponding to at least a section of a spherical surface, comprises a series of adjoining generally triangular modules subdivided into planar polygonal areas, viz., six triangular component areas, or three kite-shaped component areas each of which is constituted by an adjoining pair of two triangular areas having a common hypotenuse. In the preceding embodiments each of the modules is a projection on the surface of a circumscribing sphere of one of the equilateral triangle faces of a regular tetrahedron, octahedron or icosahedron, or a multiple projection of the several triangles into which each such regular polyhedron face is subdivided. For example, it will be noted that each of the generally triangular modules of the FIGS. 1–18 container embodiments is based on the projection of one equilateral triangular face of an octahedron, while each of the ten supermodules of FIG. 19 (each broken down into nine generally triangular modules) is based on the projection of one equilateral triangular face of one-half of an icosahedron.

Thus the three vertices of each of the generally triangular modules of these structures are either originally on the surface of the circumscribing sphere (as in the FIGS. 1–18 embodiments) or they are established on the surface of the circumscribing sphere (as in the FIG. 19 embodiment) by subdividing the triangular face of the polyhedron into smaller triangles (e.g., nine triangles as shown in FIG. 24A and described in more detail hereinafter), and projecting lines radially outwardly from the center of the circumscribing sphere to pass through the vertices of these smaller triangles. The points where these lines of projection intersect the circumscribing sphere establish the vertices of base triangles not originally on the surface of the sphere, on which planar triangles the triangular modules are based.

Each of the three kite-shaped areas constituting one generally triangular module has two vertices which fall on the adjoining sides of the generally triangular modules. These vertices are established by projecting lines radially outward from the center of the circumscribing sphere to pass through a respective point on each side of each of the equilateral triangular faces of the polyhedron (or, in the FIG. 19 embodiment, the triangular faces of the nine triangles into which each equilateral triangular face of the polyhedron is subdivided). Each of these points on the respective sides of the triangular faces through which each of these projection lines passes is established by intersecting the triangle side with a perpendicular constructed from the common point in each triangle where the bisectors of each of the three angles of the triangle intersect. If the triangle is an equilateral triangle (as it would be where an entire triangular face of a tetrahedron, octahedron or icosahedron is divided into kites) these points will be the midpoints of the sides. The only other vertex of the three kite-shaped areas (which is the common apex or vertex of all three kite-shaped areas in a single triangular module) is determined by projecting a line radially outwardly from the center of the circumscribing sphere toward the sphere surface through the common point noted above where the bisectors of the three angles of the triangle intersect. In the embodiment of FIGS. 14 and 15 this projected common kite vertex or apex lies on the surface of the circumscribing sphere. In the other previously described embodiments, where each of the kite-shaped areas is planar, this point lies somewhat below the surface of the circumscribing sphere.

The FIGS. 1–18 and FIG. 19 embodiments illustrate two concepts or principles of the present invention. The first may be stated in the following manner: that the volume of the structure is a function of the parameters of the kite-shaped panels, i.e., to make a container such as shown in FIGS. 1–18 of greater volume, twenty-four larger isomorphic flanged kite-shaped panels 3a–3x are fabricated and assembled. The second principle may be stated as follows: that the volume of the structures of this invention may be increased by subdividing each generally triangular module into smaller triangular submodules, each of which is composed of three kite-shaped panels, while maintaining the total number of groups of isomorphic or congruent panels at a minimum. That is, if the size of each panel exceeds that which is conveniently handleable on the basis of twenty-four (or sixty in the case of a structure based on an icosahedron) identical kite-shaped panels to make a structure generally corresponding to at least a section of a spherical surface, then 36, 72 or 180 kite-shaped panels classified in two groups of identical panels can be used; or 48, 96 or 240 kite-shaped panels categorized in three groups of identical panels may be employed; or 108, 216 or 540 such panels classified in four groups of identical panels may be used; or 1080 such panels categorized in six groups of identical kite-shaped panels may be utilized, etc. These principles are further illustrated in FIGS. 21–24.

Figure 21A:
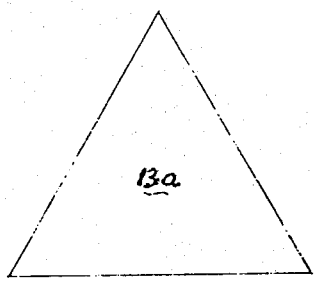
Figure 21B:
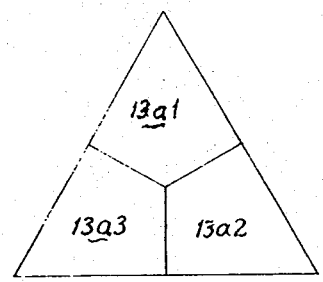

In FIGS. 21A and 21B the simplest breakdown of a triangular module 13a is illustrated, each triangular module comprising three identical kite-shaped areas, such as 13a1, 13a2 and 13a3. If a polyhedron, with four equilateral triangular faces (a regular tetrahedral pyramid) is visualized as a basic solid geometric figure around which a sphere is circumscribed, and each of the four equilateral faces is broken down or subdivided into three kite-shaped areas by erecting perpendicular bisectors from midpoints of the respective sides of each triangular face, then twelve identical planar kite-shaped areas (organized into four generally triangular modules each composed of three kite-shaped areas) will be defined. Similarly, if the solid geometric figure around which the sphere is circumscribed is a polyhedron with eight equilateral triangular faces (octahedron) or twenty equilateral triangular faces (icosahedron) the resulting twenty-four or sixty identical kite-shaped areas defined by frame members will be organized into eight or twenty generally triangular identical modules.

Figure 22A:
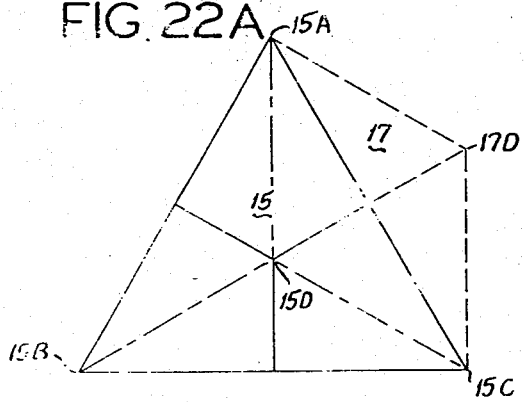
Figure 22B:
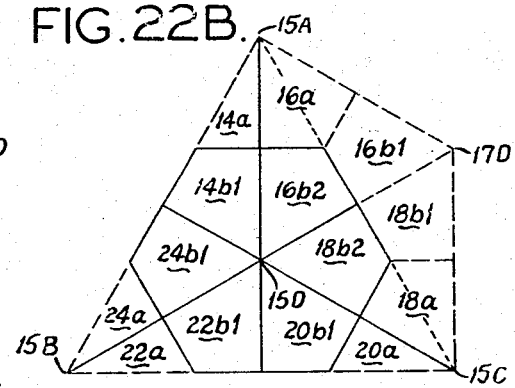

FIGS. 22A and 22B illustrate a second system of breaking down each face of a polyhedron having four, eight or twenty equilateral triangular faces into a series of kite-shaped figures. The triangle 15 defined by the points 15A, 15B and 15C are vertices defining one face of a regular tetrahedron, 15D being the intersection point of the bisectors of the three equal angles of triangle 15, and 17D is the intersection point of the angle bisectors of an adjoining triangular face 17 of the pyramid. The triangle defined by points 15A, 15D and 17D is isosceles and is in a plane shifted 60° from the plane of the equilateral triangular faces 15 and 17 of the pyramid. Three such isosceles triangular faces are formed at each of the other three corners of the tetrahedron, thereby breaking down the four equilateral triangular faces of the pyramid into a polyhedron having twelve faces which are isosceles triangles, the vertices of which are radially projected onto the surface of a circumscribing sphere, and which generally triangular modules thereby formed are each subdivided into three kite-shaped figures. The subdividing of several of these twelve isosceles triangles into kite-shaped components is shown in FIG. 22B. The triangle (15A, 15D, 17D) is isosceles even though it appears to be equilateral in the illustration because of the necessity to present a planar view of face 15 and one-third of the adjoining tetrahedron face 17. This triangle is subdivided into three kite-shaped areas 16a, 16b1 and 16b2. Similarly the identical isosceles triangle defined by the points 15D, 17D and 15C, which also lies in a plane shifted 60° relative to the tetrahedron faces 15 and 17, is subdivided into three kite-shaped figures 18a, 18b1 and 18b2. Kite-shaped component parts (or halves thereof) of four more of the twelve isosceles triangular faces are indicated at reference characters 14a, 14b1; 24a, 24b1; 22a, 22b1; and 20a, 20b1. Thus the four equilateral triangular faces of the tetrahedron have been broken down first into twelve isosceles triangles, which in turn have been subdivided into thirty-six kite-shaped figures. Only two different groups of isomorphic kite-shaped areas comprise the faces of the generally spherical structure of the present invention fabricated in accordance with this exemplary construction system. That is, flanged panels made in the shape of areas 14a, 16a, 18a, 20a, 22a and 24a are all identical or isomorphic modular components of the isosceles modules. Similarly, the other two kite-shaped components which make up any triangular module, e.g., 16b1 and 16b2, are identical or isomorphic with 14b1, 18b1, 18b2, 20b1, 22b1 and 24b1.

Instead of twelve kite-shaped areas of one size and twenty-four kite-shaped areas of a second size determining the design parameters, as is the case with the tetrahedral pyramid embodiment described above, twenty-four kites of one size and forty-eight kites of another size determine the design parameters of a structure based on an octahedron, while sixty kites of one size and 120 kites of a second size are the basis of a generally spherical structure of the present invention projected from an icosahedron in accordance with this exemplary construction system.

Figure 23A:
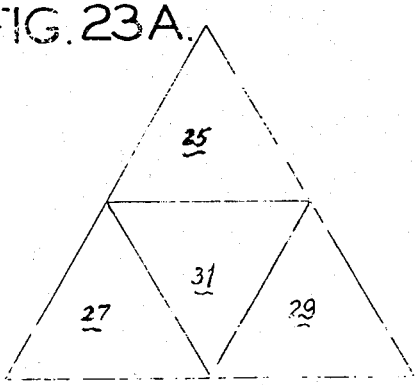
Figure 23B:
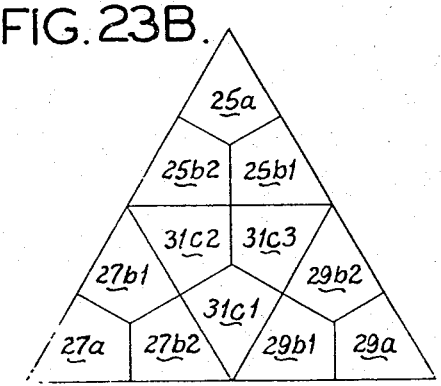

A third breakdown system or arrangement employed to form generally spherical (or portions thereof) structures of this invention is shown in FIGS. 23A and 23B. Here each of the equilateral triangular faces of one of these three regular polyhedrons is first broken down into four equilateral triangles 25, 27, 29 and 31, the vertices of which are projected onto the surface of a sphere circumscribing the regular polyhedron. FIG. 23B illustrates the subdivision of the four triangles 25, 27, 29 and 31 to form three isosceles (when projected) triangles each composed of three kite-shaped areas (25a, 25b1, 25b2), (27a, 27b1, 27b2), (29a, 29b1, 29b2) and one equilateral triangle comprising three identical kite-shaped areas 31c1, 31c2 and 31c3. In this system three different groups of identical kite-shaped figures are utilized to form the generally spherical structure, the first group consisting of identical panels based on projections of kites 25a, 27a and 29a, the second group all isomorphic with projections based on 25b1, 25b2, 27b1, 27b2, 29b1, and 29b2, and the third group all identical with projections of kites 31c1, 31c2 and 31c3. Thus generally spherical structures of the present invention having 48, 96 or 240 similar kite-shaped panels may be fabricated, there being only three different panel sizes.

Still another system utilized in accordance with the present invention for determining the number and parameters of the kite-shaped components of generally triangular modules is illustrated in FIGS. 24A and 24B in which each equilateral triangular face of one of the three previously mentioned regular polyhedrons is broken down into nine triangles 33, 35, 37, 39, 41, 43, 45, 47 and 49, the vertices of which are projected onto the surface of a circumscribing sphere to form a first set of three generally isosceles triangular modules each comprising three similar kites (33a, 33b1, 33b2), (35a, 35b1, 35b2) and (37a, 37b1, 37b2); and a second set of six generally isosceles triangular modules each comprising three similar kites (39c, 39d1, 39d2), (41c, 41d1, 41d2), (43c, 43d1, 43d2), (45c, 45d1, 45d2), (47c, 47d1, 47d2) and (49c, 49d1, 49d2). The kite-shaped areas as projected are organized or classified into four different groups, the members of each group being identical one to the other. In the final structure, panels represented by 33a, 35a and 37a are all identical members of the first group; panels represented by 33b1, 33b2, 35b1, 35b2 37b1 and 37b2 are identical members of the second group; panels represented by 39c, 41c, 43c, 45c, 47c and 49c are identical members of the third group; and the remaining twelve kite-shaped panels (via., 39d1, 39d2, 41d1, 41d2, 43d1, 43d2, 45d1, 45d2, 47d1, 47d2, 49d1 and 49d2) are all identical members of the fourth group. Thus, generally spherical structures having 108, 216 and 540 kite-shaped panels may be fabricated in accordance with this fourth system, each such structure being composed of only four different sets of identical kite panels.

Figure 24:
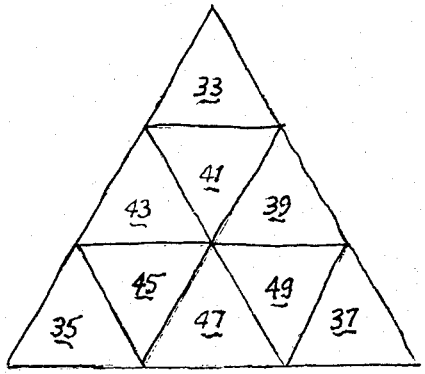
Figure 24:
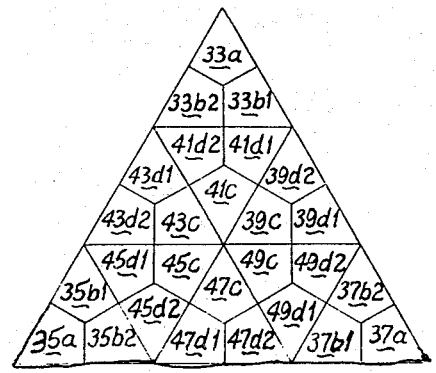

The four exemplary systems of FIGS. 21–24 are tabularly presented below, indicating the number of kite-shaped areas employed to fabricate a generally spherical structure:

|  | Fig. 21 | Fig. 22 | Fig. 23 | Fig. 24 |
|---|---|---|---|---|
| Tetrahedron | 12 | 36 | 48 | 108 |
| Octahedron | 24 | 72 | 96 | 216 |
| Icosahedron | 60 | 180 | 240 | 540 |

In accordance with the present invention and following the theory and principles discussed above in fabricating space-enclosing structures having a shape generally correspondnig to at least a section of a spherical surface, polyhedrons other than the regular tetrahedron, octahedron and icosahedron may be used as the basis of structures of my invention. Each of these three aforesaid particular regular polyhedrons is made up of identical planar equilateral triangular polygon faces. Two other well-known regular polyhedrons, viz., the hexahedron, or cube, and the dodecahedron may also be employed as a basis for the structures of the present invention. For example, each of the six faces of the cube can be broken down into four isosceles triangles and the common apex of each of these faces can be projected radially outward toward the surface of the circumscribing sphere defined by the four corner points of the cube. Each of the resulting twenty-four projected triangles can then be broken down in accordance with this invention into three kite or six triangular planar areas which when projected constitute the generally triangular modules of the structures of this invention.

Similarly the twelve pentagon faces of a regular dodecahedron can each be subdivided into five isosceles triangles, the common point or apex of which can be projected toward the surface of the circumscribing sphere. Each of these projected triangular areas is then further broken down into three kites or six triangular projected planar component areas, to establish the generally triangular modules.

It will also be understood that in addition to the five recognized regular polyhedrons noted above, there are other polyhedrons which can be used as a basis of the structures of the present invention. For example, one such polyhedron has polygon faces, consisting of twelve identical decagons, twenty identical hexagons, and thirty identical quadrilaterals, each of which polygon faces can be subdivided into isosceles triangles. Thus, each decagon can be subdivided into ten identical isosceles triangles (total of 120); each hexagon can be divided into six isosceles triangles (total of 120); and each quadrilateral can be divided into four isosceles triangles (total of 120). These 360 isosceles triangles, when each of their vertices not originally on the surface of the polyhedron's circumscribing sphere is projected to its surface and each such projected triangle is subdivided into three kite-shaped figures, provide the basis for a generally spherical structure having six groups of identical kite-shaped panels, totaling 1080 such panels (each of which may be considered to be constituted by or subdividable into two planar right triangular areas). There are many other such polyhedrons composed of two or more different sets of identical polygon faces, for example, one with 92 polygon faces, 12 of which are pentagons and 80 of which are triangles. Any one of such polyhedrons may be used in accordance with the present invention. However, it is preferred that these polyhedrons have sets of regular polygon faces so that the length of each side of each of the various different polygon faces is equal to the length of each side of all the other polygon faces of all the polygon sets which make up these complex polyhedrons. Following this system, extremely large generally spherical containers or structures can be manufactured with the minimum number of component parts and with the size of individual parts maintained within desired limits.

In the immediately following exemplary description of how the parameters of the kite-shaped areas or panels are determined, two precepts or rules obtain in order to have the least number of different categories of isomorphic symmetrical kite-shaped areas. All pairs of triangles which join at a common base line must be symmetrical with respect to a perpendicular bisector of the common base line, and all pairs of triangles which have their legs constituted by a common line must have equal bases.

Figure 25:
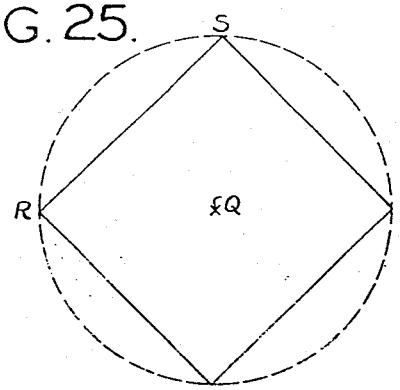
Figure 26:
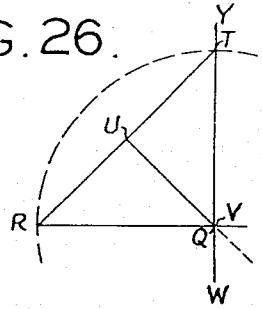

The first step in determining the design parameters of the kite-shaped areas or panels is to ascertain the ratio between the radius of the circumscribing sphere (of the polyhedron which the final container or structure approximates) and the length of the side of the polygon face. This is done by circumscribing a circle with a radius of unity or 1 about the base of a crown of the particular polyhedron selected. By "crown" is meant the group of triangular polyhedron faces which converge to form one vertex point where the planes of three or more polygon faces of the polyhedron intersect. As illustrated in FIG. 25 with Q as the center and QR as the radius of the circumscribing sphere, a circle is laid out which passes through four corner points or vertices of an octahedron, R and S being two of these vertices. It will be noted that the shape of the base of the crown of a tetrahedral pyramid would be an equilateral triangle, while that of an icosahedron would be an equilateral pentagon. In FIG. 26 (which is a view shifted 90° relative to FIG. 25, i.e., if FIG. 25 is assumed to be a plan view, FIG. 26 is an elevation) a line WY is constructed which passes through the center Q of the circumscribing sphere and is perpendicular to the plane of the circle of FIG. 25. Line QR again represents the radius of the circumscribing sphere. A line RT is then constructed from R equal in length to any side or leg of the circumscribed octahedron, such as RS, and a perpendicular bisector UV of RT is laid out. The ratio of the length of RT to TV equals the ratio of the side or leg of the particular regular face of the polyhedron to the radius of the circumscribing sphere. In the case of the tetrahedron the perpendicular bisector UV will intersect line WY at a point between Y and Q, while in the case of the icosahedron UV will intersect WY at a point below Q. By graphically scaling from FIG. 26, or the equivalent construction for other polyhedrons such as the octahedron or icosahedron, the following ratios are obtained:

|  | Radius | Side length |
|---|---|---|
| Tetrahedron | 1 | 1.633 |
| Octahedron | 1 | 1.4142 |
| Icosahedron | 1 | 1.0514 |

Considering the length of the sides of the triangles they may be calculated on the basis of being chords of an arc having the following angles (TVR):

| Tetrahedron | 109°28′ |
|---|---|
| Octahedron | 90° |
| Icosahedron | 63°20′ |

Figure 27:
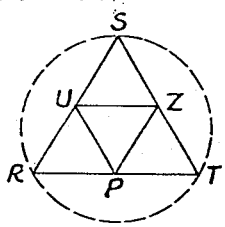
Figure 28:
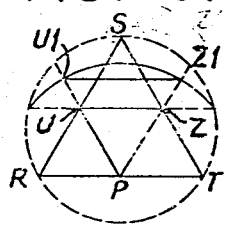
Figure 29:
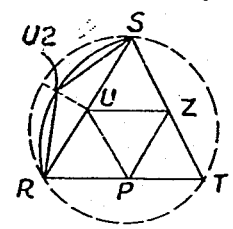

The next step in determining the parameters of the kite-shaped components is to establish the lengths of the sides of the generally triangular modules (prior to projection) employed in the systems of FIGS. 22–24. This has already been done in accordance with the system of FIG. 21, inasmuch as the vertices of the faces of the polyhedron are those of the projected triangular modules. In FIG. 27, R, S, and T are the three vertices of one equilateral triangle face of the polyhedron and the circle circumscribing this triangle and passing through these points falls on the surface of the circumscribing sphere. All arcs of the sphere passing over the sides RS, ST and TR will intersect the circumscribing circle of FIG. 27 at points R, S, and T. The triangle RST is then divided into a pattern of smaller triangles in accordance with, for example, FIG. 23A by fixing the midpoints U, Z and P of the three sides of larger triangle RST, thereby creating four smaller equilateral triangles SUZ, RUP, UZP and PZT. To ascertain the length of any of the nine line segments which make up these small modules, the desired line segment is extended in both directions to intersect the circumscribing sphere and an arc is laid off with a radius equal to that of the circumscribing sphere so as to pass through both points of intersection. The length of the projection of line segment UZ on the surface of the circumscribing sphere corresponds to the chord U1,Z1 established by the corresponding segment of the arc drawn between the respective points of intersection of the extensions of lines PU and PZ. Thus the length of each of the sides of the projection of triangle PUZ, which constitutes one of the generally triangular modules of structures of the present invention, is equal to U1,Z1. To ascertain the lengths of the other sides of the projected triangles such as SU, SZ, ZT, TP, PR and RU, all of which are equal, an arc RS with a radius equal to that of the circumscribing sphere is laid off to intersect the vertices R and S, and then a point U2 is established by the intersection of the perpendicular bisector of line RS and arc RS. The chords RU2 and U2S correspond to the projected leg segments which constitute frame members of the generally spherical structures of the present invention and comprise the other two legs of each of the projected isosceles triangles RUP, PZT and SUZ.

Figure 30:
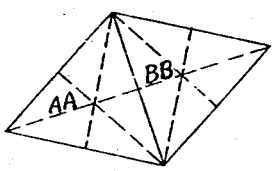
Figure 31:
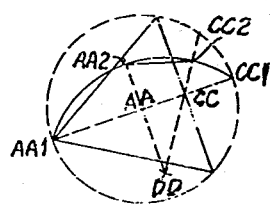
Figure 32:
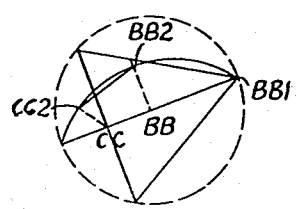
Figure 33:
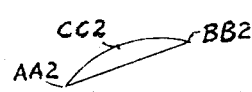

In order to ascertain the lengths of the sides or legs of projected triangles which constitute the modules formed in accordance with the system of FIG. 22A, lines which pass between two triangular faces of the circumscribed polyhedron must be projected. This is accomplished as illustrated in FIG. 30 where such a line AA,BB is indicated on a planar or flattened-out view of two adjoining equilateral triangular faces of the circumscribed tetrahedron. First a circle is laid out which circumscribes the vertices of one of the triangular polyhedron faces and lies on the surface of the circumscribing sphere (FIG. 31). Line AA,CC is then extended in both directions to intersect the circumscribing circle at AA1 and CC1 and an arc AA1,CC1 is laid off with a radius equal to that of the circumscribing sphere and passing through these two points. The center DD for this arc is located by the intersection of two arcs swung from AA1 and CC1, each with a radius equal to that of the circumscribing sphere. By extending a line from DD through AA to intersection with arc AA1,CC1, the projected point AA2 on the surface of the circumscribing sphere is established. Similarly a line is constructed from DD through CC to intersect arc AA1,CC1 at CC2, thus establishing the projection of CC on the surface of the sphere, and thereby determining an arc segment AA2,CC2. In a similar manner in FIG. 32 an arc segment CC2,BB2 is established. By adding these arc segments together (FIG. 33) and determining the length of chord AA2,BB2 of the added arcs, the length of the projection of line AA,BB, one side of a generally isosceles triangular module of a structure of the present invention, is ascertained.

Figure 34:
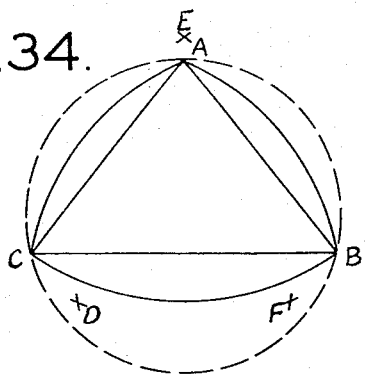

In the preceding steps the determination of each of the lengths of the sides of the projected equilateral and/or isosceles triangles (which are the basis of the generally triangular modules of the structures of the present invention) has been described. To ascertain the dimensional parameters of the kite-shaped figures or panels which constitute one of the basic components of the structures of the present invention, the steps below are followed. First, a projected triangle having leg or side lengths determined as set forth above is constructed and a circle passing through the three vertices thereof is circumscribed therearound. This is illustrated in FIG. 34 by the isosceles triangle ABC and its circumscribing circle, all points on which fall on the surface of the circumscribing sphere. Three centers D, E and F are then located by the intersection of arcs swung from the respective pairs of points A,B and B,C and C,A and with a radius equal to that of the circumscribing sphere. Using D, E and F as centers, arcs AB, BC and CA are scribed. As each of these centers D, E and F represents (for purposes of this geometric construction sequence) the center of the circumscribing sphere, arcs AB, BC and CA represent a side view of each leg (lines AB, BC and CA being chords of the corresponding arcs) of the triangles upon which the generally triangular modules are based. Next, lines D,D1 and E,E1 and F,F1 are constructed to extend through a centroid point X (equidistant from points D, E and F) to intersect the chords and arcs AB, BC and CA (FIG. 35) at points D1, D2 and D3. The chords AD1,D1B; BE1,E1C; and CF1,F1A then correspond in length to the six frame members which define the sides of each generally triangular module made up of three kite-shaped areas. These six lines also correspond to six of the nine sides of the three projected kites. Lines F2,D2 and D2,E2 and E2,F2 are then drawn (FIG. 36) between the points of intersections of lines D,D1 and E,E1 and F,F1 with their respective chords AB, BC and CA. These lines F2,D2 and D2,E2 and E2,F2, drawn in the plane of the triangle ABC, represent the diagonals of the kite-shaped areas which are perpendicular to the lines or diagonals of symmetry thereof. That is, F2,D2 is the diagonal or line or asymmetry of a kite-shaped figure X,F2,A,D2 in the plane of triangle ABC. Similarly D2,E2 and E2,F2 are lines of asymmetry of the other two kite-shaped areas X,D2,B,E2 and X,E2,C,F2 also in the plane of triangle ABC.

Figure 37:
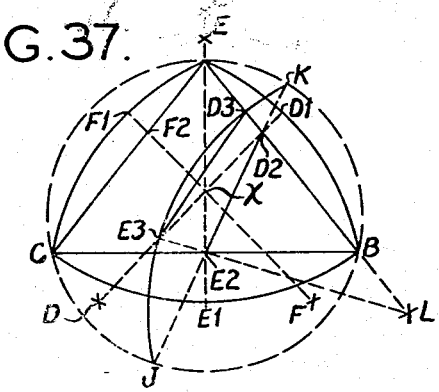

To ascertain the lengths of these diagonals in the planes of the projected kite-shaped areas, they must be extended in both directions to intersect the circumscribing circle at points J and K. This step is illustrated in FIG. 37 only for determining the length as projected of one line of asymmetry D2,E2; the lengths as projected of the other lines of asymmetry, E2,F2 and F2,D2, being determined simply by analogously repeating the geometric constructions set forth in regard to D2,E2. Using the radius of the circumscribing sphere, arcs are scribed from J and K to intersect at a center L representing the center of the circumscribing sphere. Arc JK is then laid off with a radius equal to that of the circumscribing sphere and lines are drawn from L through E2 and D2 to intersect arc JK at E3 and D3. These points represent the location of the extremities of the asymmetric diagonal of the projected kite-shaped figure, and the length of the chord E3,D3 is the projected or final length thereof. The midpoint of E3,D3, as indicated by reference character H3 (FIG. 38) is the intersection of the lines of symmetry and asymmetry of this one final or projected kite. By erecting a perpendicular bisector at H3, its intersection with E2,D2 establishes the intersection of these diagonals in the plane of triangle ABC as indicated at H2.

Figure 42:
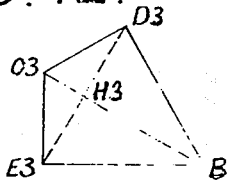
Figure 43:
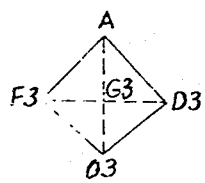
Figure 35:
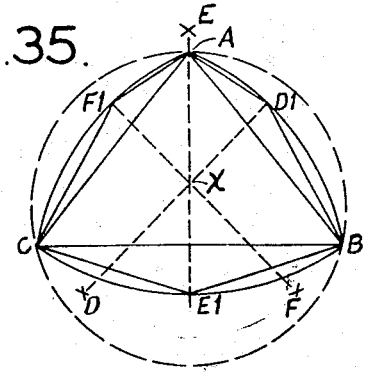
Figure 36:
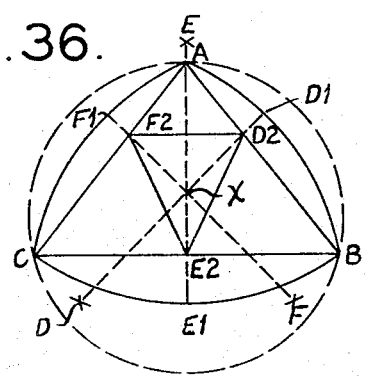
Figure 38:
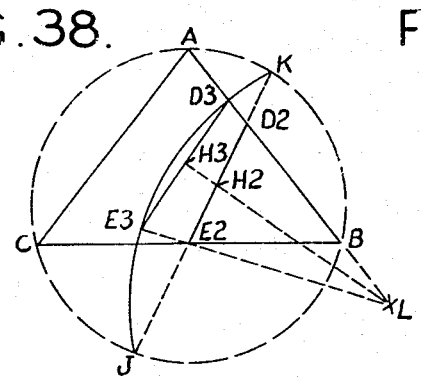
Figure 39:
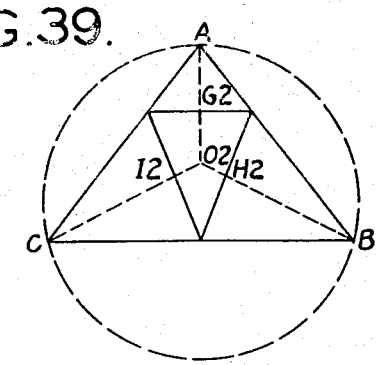
Figure 40:
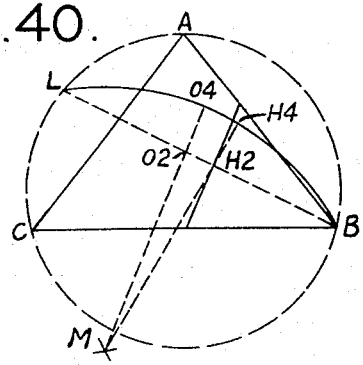
Figure 41:
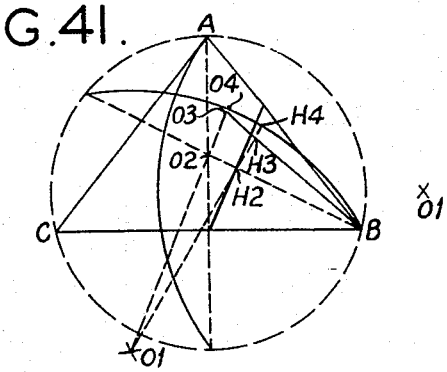

Points G2 and I2 are similarly determined and represent the other intersections of the two diagonals of each of the other two kites in the plane of triangle ABC. By drawing lines from each of the vertices A, B and C through the respective points G2, H2 and I2 a common point of intersection 02 is established (FIG. 39) which is the apex or common point of the three kites in the plane of triangle ABC. The lines B,02 and C,02 and A,02 are the lengths of the diagonals of symmetry of the three kites in the plane of triangle ABC. To ascertain the final or projected length of one of these lines of symmetry, 02,H2 is extended in both directions to intersect the circumscribing circle at point L, the other intersection point being B (FIG. 40). Two arcs, each having a radius equal to that of the circumscribing sphere, are swung from L and B to locate a center point M. Using M as the center arc, LB is constructed with the radius equal to that of the circumscribing sphere. By drawing lines from M through points 02 and H2 to respectively intersect the arc LB, two points 04 and H4 are located. These respectively represent the radial projections of the apex 0 and kite diagonal intersection H2 on the surface of the circumscribing sphere. As neither the common apex of the projected kites nor the intersections of the diagonals thereof lie on the surface of the circumscribing sphere (in this example), one further step must be taken to ascertain the projected length of the diagonal of symmetry of this projected kite-shaped figure. The distance that the kite diagonal intersection H2 in the plane of triangle ABC lies below its projection H3 on the surface of the projected kite was determined in the construction of FIG. 38. If this length H2,H3 is laid off from H2 on line H2,H4 of FIG. 41 and a line is drawn from vertex B to intersect 01,H4 at point H3, the point (which is indicated at 03) where the extension of this line crosses 01,04 represents the common apex of the three projected or final kites. It will be noted that point 03 is slightly below the surface of the circumscribing sphere in this example. The length of line 03,B is then equal to the length of the diagonal of symmetry of the projected or final flat kite-shaped figure 03,D3,B,E3. The length of the perpendicular diagonal of asymmetry of this kite (D3,E3) was determined as illustrated in FIG. 38. The length of the longer legs of this kite was determined as illustrated in FIG. 35. By laying out these distances as shown in FIG. 42, the precise size of one of the kite-shaped panels is illustrated. This kite is isomorphic or identical to the other larger kite (03,E3,C,F3), so that no further geometric construction is needed to ascertain its parameters. The dimensions of the third and smaller kite comprising the generally triangular module is finally ascertained by following the same steps of geometric construction to project F2 (to determine projected point F3) and the intersection point of its diagonal (G3) and these lengths are laid off as illustrated in FIG. 43. Thus, the dimensions of each of the three kite-shaped panel components which make up generally isosceles triangular modules in accordance with the FIG. 22 system have been determined.

The determination of the parameters of kite-shaped panel components that comprise a generally equilateral triangular module (rather than an isosceles one as illustrated in FIGS. 34–43) would, of course, be much simpler in that only one projection of each of the diagonals of symmetry and asymmetry would be necessary, all three sets of such diagonals in such instance being respectively identical.

Figure 44:
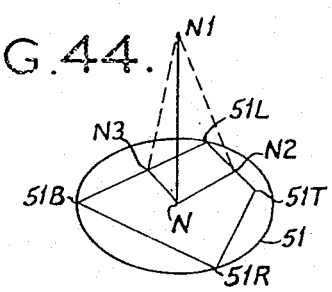

To determine the angle or angles of the flanges relative to the face of the kite-shaped panels, a circle 51 is circumscribed around the three vertices 51R, 51B and 51L of the panel which lie on the surface of the circumscribing sphere, as illustrated in FIG. 44. A line N,N1 is projected from the center N of the circumscribing circle and is therefore perpendicular to the plane of the kite-shaped panel. Then a line N,N2 is constructed from N to be perpendicular to any side of the kite panel such as 51L,51T. The supplement of angle N1,N2,N is the angle of an outwardly directed flange for sides 51L,51T and 51T,51R. If the flanges are to be inwardly directed, the flange angle will be equal to N1,N2,N. A similar perpendicular N3,N is erected from side 51B,51L to establish the flange angle on the longer legs of the kite-shaped panel. This flange angle is therefore N1,N3,N or the supplement thereof, depending on whether the flanges are inwardly or outwardly directed.

It will be noted that in the case of some of the generally spherical structures of this invention (i.e., those of FIGS. 1, 2 and 16–18) determined in accordance with the system of FIGS. 21A and 21B, the identical kite-shaped panels which comprise the structure have flanges which are all angled equally relative to the plane of the panel. The angles of one pair of flanges of the 12- and 60-kite panel arrangements (under this FIG. 21 system) are equal to one value (viz, 101°15′ for the 60 panel) and the angle of the other pair of flanges of each of these kite panels is a second value (viz, 105°32′ for the 60 panel). In the systems of FIGS. 22A and 22B, 23A and 23B, and 24A and 24B, the angles of two pairs of flanges on each panel in each isomorphic group also are equal to one value and the angles of the flanges of the other two sides are equal to a second value.

In the embodiments illustrated above in FIGS. 1–19, all of the generally triangular modules and the component kite-shaped or triangular areas were formed by interconnected straight rigid frame members and each of the two frame members which constituted each side of the module was angularly interconnected end-to-end at an intermediate junction or vertex based on a radially outward projection of a point on the side of the unprojected or base triangle. This latter point was determined by the intersection of a perpendicular erected from a common central point of the base triangle formed by the common intersection of three lines bisecting the three angles of the base triangle. It was further pointed out that in the simplest case where the base triangle to be projected was equilateral, these intermediate points would also correspond to the midpoints of the sides of the base triangles. Following the second principle set forth above (i.e., where the size of the structure is to be increased without increasing the general over-all size of the triangular module and kite components and one of the systems of FIGS. 22–24 is followed to thereby subdivide each equilateral triangular face into smaller triangles), isosceles triangles having two equal legs and a base of a different length are formed in the process of multiple projection. That is, for example, in the system of FIGS. 23A and 23B, each equilateral triangle polygon face is broken down into four smaller equilateral triangles and the three midpoints of the sides of the polygon face are projected radially outwardly to fall on the surface of the circumscribing sphere. The three smaller triangles 25, 27 and 29 after this first projection step become isosceles triangles because two vertices thereof are moved outwardly to the surface of the circumscribing sphere, while the third vertex which was on the sphere surface was not so moved. This effectively lengthens one of the sides of each of the smaller triangles 25, 27 and 29 relative to the other two sides. The fourth triangle 31 has all three of its vertices moved outwardly an equal distance to the surface of the sphere and therefore remains equilateral as projected. Thus, in the systems of FIGS. 22–24, isosceles triangles are subdivided into kite-shaped areas, at least all but one of the vertices of which are projected outwardly to the surface of the sphere.

In accordance with the present invention, two systems are provided for subdividing each base triangle into three kite (and six triangle) components. In the preceding embodiments, the central or common point of each of these base triangles was established by bisecting each of the three spherical angles of the spherical triangle (having vertices identical to those of the base triangle) on the surface of the circumscribing sphere to form three spherical arcs intersecting at one point. From this single common point on the surface of the sphere, three spherical arcs were respectively drawn to intersect the sides of the spherical triangle at right angles thereto. These three intermediate points thus formed on the respective sides of the spherical triangle and the common point also on the surface of the sphere were respectively projected inwardly along respective four radii of the sphere passed through these four points. The four points of intersection of these lines in the plane of the base triangle determined the intermediate points on the sides of the planar base triangles and the common central point thereof. The lines drawn from this common point to the intermediate points on the respective sides of the base triangle established the kite-shaped areas which were projected to form the kite-shaped figures. This arrangement always forms symmetrical kite-shaped figures and (except in the case of an equilateral triangle which is simply a special form of an isoceles triangle) the two frame members forming each of the two equal-length sides of the projected triangular modules will be of unequal length. That is, the two frame members forming one side of the triangular module will be equal in length, while two of the four frame members forming the other two sides will be equal to a first length and the remaining two frame members forming these other two sides will be equal to a second length. This first system of forming three kites (or six triangles), utilized in all preceding embodiments, is illustrated in FIG. 45, where an isoceles base triangle having vertices 61a, 61b and 61c on the surface of the circumscribing sphere is indicated at reference numeral 61. From a common or central point or apex AP, established as noted above, three dash-dot lines 61d, 61e and 61f are drawn to the three vertices 61a, 61b and 61c. Also, from this point AP to intermediate points 61j, 61k and 61l, established as noted above, are erected three lines 61g, 61h and 61i. Thus, two identical symmetrical kites 61B and 61C and a similar but different symmetrical kite 61A are thereby defined in the plane of the base triangle. Also, three pairs of right triangles are defined, 61AR,61AL and 61BR,61BL and 61CR,61CL, each pair having a common hypotenuse 61d, 61e and 61f, respectively. (It will be observed that each of these pairs of adjoining right triangles constitutes a kite and this is illustrated in FIGS. 14 and 15 where each kite panel is dihedrally bent or folded on its line of symmetry, thereby forming two hypotenuse-joined triangles.)

The other system utilized in the present invention for subdividing the base triangle into three kites or six triangles is illustrated in FIG. 46. Reference numeral 63 generally indicates an isoceles triangle identical to triangle 61, except subdivided differently. In this latter system, instead of establishing an apex AP by the intersection of the three spherical arc bisectors of the spherical angles as was the case in FIG. 45, an apex AP1 is established by erecting spherical arcs from the midpoints of the spherical triangle sides, and at right angles thereto, to establish a common point on the surface of the sphere. These midpoints on the sides of the spherical triangle and this new central point, also on the surface of the sphere, when projected radially inwardly on respective radii of the sphere establish points 63j, 63k and 63l and central point AP1 in the plane of the base triangle. Two of the kites thus formed, 63B and 63C, are unsymmetrical, while the third, 63A, is symmetrical. Again, as in FIG. 45, the three kites are constituted by three pairs of right triangles, each pair having a common hypotenuse. However, in FIG. 46 the right triangles are symmetrical around common legs instead of their three common hypotenuses. In both systems of FIGS. 45 and 46, the six triangles are right triangles and, assuming the intermediate points on the base triangle sides and the apices or central points are all projected to the surface (as described above and shown in FIGS. 34–41) of the circumscribing sphere, the frame members which define the generally triangular modules and each of their six component triangles (or three kites constituted by pairs thereof) are chords of spherical right triangles.

Space-enclosing dome structures embodying each of these two systems are illustrated in FIGS. 47 and 48. Dome 1D of FIG. 47 is based on the system of FIG. 45 and a regular hexahedron (cube), each of the faces of which is subdivided into four isosceles triangles. Frame members of one generally triangular module of dome 1D are referenced with characters corresponding to those used to identify the comparable unprojected lines of base triangle 61 of FIG. 45, but prefaced with numerals 71 instead of 61. Apex AP2 corresponds to apex AP projected radially outwardly from the center of the circumscribing sphere along a line passing through AP to the point where it intersects the sphere. Similarly, points 71j, 71k and 71l are the points on the surface of the circumscribing sphere corresponding to 61j, 61k and 61l as projected radially outwardly along a line from the sphere center through points 61j, 61k and 61l. Thus dome 1D is constituted by 144 planar triangular figures organized as 72 pairs of two groups of identical symmetrical dihedrally bent kites, which form 24 generally triangular modules each of which as frame members corresponding to projections of four subdivided equilateral or square faces of one-half of a cube.

Dome 1E of FIG. 48 similarly illustrateds a space-enclosing dome-shaped structure of the present invention analogous to that of FIG. 47 but based on the system of FIG. 46. Again, reference characters are used in FIG. 48 which correspond to those in FIG. 46, except that they are prefaced by numeral 73 instead of 63, and AP3 represents the projection of point AP1.

One significant advantage in using the system of FIG. 46 rather than that of FIG. 45 is that there is a finite limit to the subdividing of the triangular faces of the base polyhedron (or the triangular subdivisions of polyhedrons which have other than triangular faces, e.g., dodecahedrons, etc.) under the method of FIG. 45. That is, the perpendiculars to the sides of the triangle upon which the finally projected generally triangular module is based must have the same points of junction as the corresponding perpendiculars in all adjoining triangular modules. There is no such limitation under the multiple subdivision, multiple projection system of FIG. 46, inasmuch as each perpendicular is a bisector of the side of the triangle and the common sides of two triangles are inherently the same length. Thus, a third principle of this invention could be stated as follows: that the volume of the structures of the present invention may be further increased, without increasing the size of each of the kite- or triangle-shaped areas which constitute the triangular modules, by converting any triangular module into a supermodule by further subdividing any existing triangular module into three smaller triangles in accordance with the method of FIG. 46. Thus a minimum number of different groups of identical kite or triangular panels of a given size will be provided to construct any given-size container based on a given starting or base polyhedron. However, in the method of FIG. 46, if the triangular module is made up of three kite-shaped panels or areas, two of the three kites may be identically unsymmetrical, while the third will be symmetrical.

In the embodiments illustrated in FIGS. 1, 2, 14–19, 47 and 48, the vertices of the triangels on which the tirangular modules were based were on the surface of the circumscribing sphere. Also, the intermediate points on the sides of the triangle (which constituted other vertices of the kite subdivisions thereof) were projected outwardly to fall on the surface of the circumscribing sphere. Thus in each instance the three vertices and the intermediate junction point on each side of the generally triangular module were on the surface of the circumscribing sphere. The apex or common vertex of the three kites in each generally triangular module were either on the surface of the circumscribing sphere (FIGS. 14 and 15) or slightly below the surface thereof (FIGS. 1, 2 and 16–19). The positioning of the apex on the surface of the sphere in FIGS. 14 and 15 was possible because each of the three component kites of each module was dihedrally bent along its symmetrical axis thereby to raise the projected apex to the surface of the sphere. It will be noted that the dihedral angle between the two triangular halves of such a bent kite-shaped panel may be reversed relative to that illustrated in FIG. 15, i.e., the lines of symmetry of the kites could be moved inwardly rather than outwardly. Also, the vertices of the triangular module and the apex could be positioned on the surface of an inner or inscribed sphere and the intermediate points on the sides of the triangle constituting the triangular polygon face of the polyhedron could be projected radially outward to fall on the surface of a concentric circumscribing sphere.

This is illustrated in FIG. 49 in which a dome-like space-enclosing structure is indicated generally at reference character 1D. This panelled structure is based on an icosahedron in which each of the twenty equilateral polygon faces thereof is subdivided in accordance with the system of FIGS. 23A and 23B. One of the twenty equilateral triangular faces of the icosahedron is indicated by vertices 75A1, 75A2 and 75A3 which define a generally triangular supermodule which is broken down into four smaller base triangles. The six vertices of these four base triangles are 75A1, 75B1, 75B3; 75B1, 75A2, 75B2; 75B1, 75B2, 75B3; and 75B3, 75B2, 75A3. Each of these six vertices in this FIG. 49 embodiment falls on the surface of a sphere which is circumscribed relative to the base icosahedron, but becomes an inscribed sphere as will be apparent below. The central points or apices of these four base triangles are projected outwardly to the surface of this sphere as indicated at 75C1, 75C2, 75C3 and 75C4. A larger sphere concentric with the abovementioned sphere is then established and the intermediate point or junction on each of the base triangle sides is projected outwardly to that larger sphere to establish points 75D1–75D9 and the rigid frame members are constructed to correspond to the linear distances between the aforementioned vertices, junctions and apices. Thus, in effect dome 1D is defined by two concentric spheres of definition, one established by the inner or inscribed curved spherical surface on which all vertices 75A1–75A3 and apices 75C1–75C4 lie; and the other by the outer or circumscribed curved spherical surface on which all the junctions 75D1–75D9 lie.

Such a space-enclosing structure composed of generally triangular modules each having three dihedrally bent kites (such as, for example, the kite defined by points 75A1, 75D1, 75C1, 75D6) or three pairs of angled planar triangular panels or areas (such as, for example, as defined by points 75A1, 75D1, 75C1 and points 75A1, 75C1, 75D6) has an added advantage in that additional structural reinforcing or bracing members can be utilized in instances where unusual and exceptional stresses are possible. In such instances internal and/or external bracing members in the form of straight rods, beams, ties, etc. may be interconnected internally between all adjacent respective apices such as 75C1–75C3 and 75C3–75C4 and 75C2–75C3, etc. External straight braces may be similarly employed to rigidly externally tie together all adjacent junction points, such as 75D1–75D7; 75D7–75D6; and 75D6–75D1, etc. Depending on whether the added stress is internal or external relative to the dome, compression or tension bracing members are selected for either internal or external interconnection. In order to avoid obscuring the more essential structural details of dome 1D, these bracing members are not specifically illustrated.

It will be noted that the space-enclosing structures of this invention can also be visualized in a somewhat modified aspect. Each of the three pairs of angularly-interconnected rigid frame members (i.e., strain-resisting chord members), which form the three sides of the triangular modules having their three vertices on the spherical surface, lies in one of three respective planes which intersect at the center of the sphere. Thus, these three planes form a pencil of planes intersecting at the center of the sphere. The three angularly bent sides of the triangular modules may also be considered as margins of a composite group of the six triangular areas, or three kite-shaped areas, which constitute each triangular module.

It will be understood that three concentric spheres of definition for the vertices, apices and junction points also may be employed. For example, the inner or inscribed sphere may be established by the apices, an intermediate sphere may be established by the vertices, and an outer or circumscribing sphere may be established by the junctions, or other combinations which will be apparent in the light of the foregoing disclosure to those skilled in this art. Further it will be noted that the planar kite and triangular areas may not only be integrally formed of any customary material of construction, such as metal or synthetic resin, but may be fabricated of composite laminated, cored, hollow, or reinforced planar panels. Moreover, instead of using flanged panels it will be noted that the enclosure may be an open framework of straight rigid frame members as defined with the openings optionally panelled or left open. Thus, for example, flat unflanged metal panels may be welded or otherwise secured to the frame members.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. A space-enclosing structure comprising an assembly of generally triangular modules each side of which is constituted by two straight rigid frame members angularly interconnected end-to-end at a junction, and at least three additional straight rigid frame members each respectively interconnected between one of the three junctions thereby formed and a single common point, each of said additional frame members respectively extending perpendicularly relative to the two angularly interconnected frame members forming the junction at which it is connected.

2. A space-enclosing structure as set forth in claim 1 in which the vertices of the triangular modules and the respective common points all fall on the surface of an inscribed sphere.

3. A space-enclosing structure as set forth in claim 1 in which the vertices and junctions of the triangular modules all fall on the surface of a circumscribing sphere.

4. A space-enclosing structure as set forth in claim 1 in which the vertices and junctions of the triangular modules and the respective common points thereof all fall on the surface of a circumscribing sphere.

5. A space-enclosing structure as set forth in claim 1 in which the vertices and common points of all the triangular modules fall on the surface of an inscribed sphere and the junctions thereof fall on the surface of a circumscribing sphere.

6. A space-enclosing structure as set forth in claim 1 in which the vertices and common points of all the triangular modules fall on the surface of a circumscribing sphere and the junctions thereof fall on the surface of an inscribed sphere.

7. A space-enclosing structure comprising an assembly of generally isosceles triangular modules the vertices of which fall on the surface of a circumscribing sphere, each side of each of said triangular modules being constituted by two straight rigid frame members angularly interconnected end-to-end at a junction, and at least three additional straight rigid frame members each respectively interconnected between one of the three junctions thereby formed and a single common point, each of said additional frame members respectively extending perpendicularly relative to the two angularly interconnected frame members forming the junction at which it is connected, the rigid frame members defining planar polygonal areas each of which has two unequal sides.

8. A space-enclosing structure as set forth in claim 7, in which each of said polygonal areas is a kite-shaped quadrilateral.

9. A space-enclosing structure as set forth in claim 7 which further includes an additional three straight rigid frame members respectively interconnecting said three vertices with said common point, said polygonal areas being triangular.

10. A space-enclosing structure as set forth in claim 9, in which each of the rigid frame members comprising each of said triangles is a chord of a spherical right triangle and in which each of said junctions and said common point also fall on the surface of the circumscribing sphere.

11. A space-enclosing structure as set forth in claim 7, in which the six said angularly interconnected frame members are equal in length.

12. A space-enclosing structure as set forth in claim 7, in which two of the pairs of said angularly interconnected frame members which define a side of said triangular module have unequal-length frame members, and in which the frame members constituting the other of said pairs are equal in length.

13. A space-enclosing structure as set forth in claim 7, in which one of the pairs of said angularly interconnected frame members which define a side of said triangular module have equal-length frame members of a first length, and in which the four frame members constituting the other two of said pairs have equal-length frame members of a second length.

14. A space-enclosing structure comprising an assembly of generally isosceles triangular modules the three vertices of which fall on the surface of a circumscribing sphere, each module comprising twelve interconnected straight rigid frame members so arranged as to define six adjoining planar triangular areas, each of said six triangular areas being defined by three rigid frame members each of which is substantially the chord of a spherical right triangle, said six triangular areas being arranged in a pattern in which three of the rigid frame members each respectively constitute the common leg of three adjoining pairs of triangular areas and three other frame members each respectively constitute a common hypotenuse of three adjoining pairs of triangular areas, at least all but one of the points of intersection of the frame members also lying on the surface of said circumscribing sphere.

15. A space-enclosing structure as set forth in claim 14, in which each of said triangular-shaped areas is constituted by a flat panel.

16. A space-enclosing structure as set forth in claim 15, in which each of said panels is integral with its three defining frame members, each frame member being constituted by two adjoining flanges of two adjacent panels.

17. A space-enclosing structure comprising three pairs of angled respectively coplanar straight rigid frame members interconnected end-to-end at a first set of junctions, the other ends of said respective pairs being joined at a second set of junctions which fall on the surface of a circumscribing sphere and constitute vertices of a generally triangular module, the first and second junctions of each pair respectively lying in three planes which intersect virtually at a point constituted by a center of said sphere, and three additional straight rigid frame members each having one end thereof connected to a common junction and lying in planes respectively perpendicular to said first-named planes, the other ends of said additional frame members respectively interconnected to said first junctions.

18. A space-enclosing structure comprising an assembly of generally triangular modules each side of which is constituted by two straight rigid first frame members angularly interconnected end-to-end at a junction, each module including three additional straight rigid second frame members each respectively interconnected between one of the three junctions thereby formed and a single common apex, each of said second frame members respectively extending perpendicularly relative to the two angularly interconnected frame members forming the junction at which it is connected, each module further including three additional straight rigid third frame members respectively interconnected between vertices of said triangular module and said apex thereby defining a pattern of three pairs of generally right-triangular-shaped planar areas having a common hypotenuse constituted by one of said third frame members, each such adjoining pair of triangular-shaped areas being dihedrally angled along the line of said third frame members, each of said second frame members constituting a common leg of a set of two adjoining triangular areas, each of said sets of adjoining triangles being dihedrally angled along the line of said second frame member.

19. A space-enclosing structure as set forth in claim 18, in which each of said apices and vertices falls on the surface of a circumscribing sphere, and each of said junctions falls on the surface of an inscribed sphere.

20. A space-enclosing structure as set forth in claim 19 which further includes bracing members interconnecting each of said apices.

21. A space-enclosing structure comprising an assembly of modules, each module comprising nine straight rigid frame members so arranged as to define three four-sided kite-shaped figures, each kite-shaped figure having one line of symmetry and a perpendicular line of asymmetry, said kite-shaped figures being connected by three of their rigid frame members to form an apex at which said lines of symmetry converge, two remaining frame members of each kite-shaped area terminating at opposite ends of the respective lines of symmetry to form vertices at the surface of a circumscribing sphere, the other ends of said adjoining three frame members and pairs of said remaining frame members terminating in three vertices also lying at the surface of said circumscribing sphere.

22. A space-enclosing structure as set forth in claim 21 wherein each of said kite-shaped figures comprises a panel dihedrally bent along the line of symmetry of the figure to place said apex also at the surface of said circumscribing sphere.

23. A space-enclosing structure as set forth in claim 21 wherein each of said kite-shaped figures comprises a panel joining the frame members which define the figure, said panel having a series of spaced reinforcing ribs parallel to said line of symmetry.

24. A space-enclosing structure as set forth in claim 21 wherein each of said kite-shaped figures is constituted by a panel having four integral edge flanges projecting angularly therefrom, each of said frame members comprising two mating flanges secured together face-to-face, and wherein there are not more than six groups of identical flanged panels and each of the flanged panels in any one group is nestable one within another.

25. A generally spherical hollow container comprising an assembly of panels each having four peripheral flanges constituted by straight rigid frame members so arranged as to define a kite-shaped area, each of said kite-shaped areas being associated with two adjoining kite-shaped areas to form triangle the three vertices of which fall on the surface of a circumscribing sphere, at least all but one of the intersections of all the frame members comprising each set of three adjoining kite-shaped areas also lying on the surface of said circumscribing sphere.

26. A generally spherical hollow container comprising an assembly of modules, each module comprising nine straight rigid frame members so arranged as to define three four-sided kite-shaped figures, each kite-shaped figure having one line of symmetry and a perpendicular line of asymmetry, said kite-shaped figures being connected by three of their rigid frame members to form an apex at which said lines of symmetry converge, two remaining frame members of each kite-shaped area terminating at opposite ends of the respective lines of symmetry to form three first vertices at the surface of a circumscribing sphere, the other ends of said adjoining three frame members and pairs of said remaining frame members terminating in three second vertices also lying at the surface of said circumscribing sphere, each of said kite-shaped figures being constituted by a panel secured to the respective four frame members which define each of said figures.

27. A container as set forth in claim 26 which further includes two parallel spaced-apart rings and a plurality of struts interconnecting points on the inner periphery of the ring to respective apices, whereby the container is suspended and supported by the struts within the rings and is mobile by means of said rings.

28. A container as set forth in claim 27 which further includes two studs affixed to two diametrically opposed first vertices and projecting outwardly from said container on an axis concentric with said rings and perpendicular to the planes thereof, and a clevis having its ends adapted to respectively engage said studs whereby said container may be towed.

References Cited by the Examiner

UNITED STATES PATENTS

| | | | |
|---|---|---|---|
| 6,826 | 10/1849 | Farley | 280—5 |
| 1,916,051 | 6/1933 | Jagschitz | 113—120 |
| 1,933,142 | 10/1933 | Jagschitz | 113—120 |
| 2,470,986 | 5/1949 | Jackson | 220—1 |
| 2,505,343 | 4/1950 | Stolz | 52—557 |
| 2,682,235 | 6/1954 | Fuller | 52—81 |
| 2,730,798 | 1/1956 | Larsen | 220—1 X |
| 2,731,334 | 1/1956 | Wissmiller | 220—1 X |
| 2,736,072 | 2/1956 | Woods. | |
| 2,818,658 | 1/1958 | Barnes | 34—126 |
| 2,918,992 | 12/1959 | Gelsavage | 52—81 |
| 2,978,074 | 4/1961 | Schmidt | 52—81 |
| 2,978,704 | 4/1961 | Cohen et al. | 52—81 X |

FOREIGN PATENTS 219,116  12/1958  Australia.

RICHARD W. COOKE, JR., *Primary Examiner.*
JOEL REZNEK, *Examiner.*